(12) United States Patent
Kofman

(10) Patent No.: US 11,300,105 B2
(45) Date of Patent: Apr. 12, 2022

(54) WIND TURBINE WITH A MOVABLE CONTAINER HOUSING A HOISTING MECHANISM

(71) Applicant: Vestas Wind Systems A/S, Aarhus (DK)

(72) Inventor: Joris Kofman, Aalborg (DK)

(73) Assignee: Vestas Wind Systems A/S, Aarhus N. (DK)

(*) Notice: Subject to any disclaimer, the term of this patent is extended or adjusted under 35 U.S.C. 154(b) by 43 days.

(21) Appl. No.: 16/640,513

(22) PCT Filed: Aug. 20, 2018

(86) PCT No.: PCT/DK2018/050201
§ 371 (c)(1),
(2) Date: Feb. 20, 2020

(87) PCT Pub. No.: WO2019/042506
PCT Pub. Date: Mar. 7, 2019

(65) Prior Publication Data
US 2020/0362824 A1    Nov. 19, 2020

(30) Foreign Application Priority Data
Aug. 29, 2017  (DK) ............................ PA 2017 70643

(51) Int. Cl.
*F03D 13/10* (2016.01)
*F03D 13/40* (2016.01)
*F03D 80/50* (2016.01)

(52) U.S. Cl.
CPC ............. *F03D 13/10* (2016.05); *F03D 13/40* (2016.05); *F03D 80/50* (2016.05); *F05B 2230/61* (2013.01); *F05B 2230/70* (2013.01)

(58) Field of Classification Search
CPC .......... F03D 13/10; F03D 13/40; F03D 80/50; F05B 2230/61; F05B 2230/70; F05B 2230/80; B66C 1/108
See application file for complete search history.

(56) References Cited

U.S. PATENT DOCUMENTS 6,750,559 B2   6/2004   Becker
9,359,129 B1   6/2016   Royt
(Continued)

FOREIGN PATENT DOCUMENTS

DE         10013442 C1    10/2001
DE     102007062622 A1     6/2009
(Continued)

OTHER PUBLICATIONS

Danish Patent and Trademark Office, Search and Examination Report in PA 2017 70643, dated Feb. 14, 2018.
(Continued)

*Primary Examiner* — Matthew P Travers
(74) *Attorney, Agent, or Firm* — Wood Herron & Evans LLP

(57) ABSTRACT

A wind turbine (1) comprising a tower (2) and a nacelle (3) mounted on the tower (2) is disclosed. A movable container (39) is mounted on a lower part of the nacelle (3) or suspended below the nacelle (3), the movable container (39) housing a hoisting mechanism for hoisting and/or lowering the movable container (39) and for hoisting and/or lowering wind turbine components (9, 10, 11).

11 Claims, 17 Drawing Sheets

(56) References Cited

U.S. PATENT DOCUMENTS

| | | | |
|---|---|---|---|
| 2001/0052169 A1 | 12/2001 | Hove | |
| 2012/0146335 A1 | 6/2012 | Bywaters et al. | |
| 2015/0061803 A1 | 3/2015 | Gaard et al. | |
| 2015/0136522 A1 | 5/2015 | Bergmann et al. | |
| 2017/0022979 A1* | 1/2017 | Teichert | B66B 9/00 |
| 2018/0335023 A1* | 11/2018 | Trede | F03D 80/80 |
| 2019/0047824 A1* | 2/2019 | Ifversen | A62B 1/02 |
| 2019/0257292 A1* | 8/2019 | Melen | F03D 13/10 |

FOREIGN PATENT DOCUMENTS

| | | |
|---|---|---|
| EP | 1991775 A1 | 11/2008 |
| EP | 2388480 A1 | 11/2011 |
| EP | 3406898 A1 | 11/2018 |
| KR | 20120114981 A | 10/2012 |
| WO | 8803100 A1 | 5/1988 |
| WO | 2011108933 A1 | 9/2011 |

OTHER PUBLICATIONS

European Patent Office, International Search Report and Written Opinion in PCT Application No. PCT/DK2018/050201, dated Oct. 31, 2018.
European Patent Office, Examination Report in EP 18759852.9, dated Dec. 4, 2020.

* cited by examiner

WIND TURBINE WITH A MOVABLE CONTAINER HOUSING A HOISTING MECHANISM

FIELD OF THE INVENTION

The present invention relates to a wind turbine comprising a tower and a nacelle mounted on the tower. The wind turbine of the invention further comprises a movable container housing a hoisting mechanism for hoisting and/or lowering the movable container as well as wind turbine components to/from the nacelle.

BACKGROUND OF THE INVENTION

In wind turbines it is sometimes necessary to move wind turbine components, e.g. moving drive train components in the nacelle or hoisting or lowering other wind turbine components, such as wind turbine blades, hub, etc., e.g. in order to mount a wind turbine component, unmount or dismantle a wind turbine component, replace a wind turbine component or perform maintenance or repair on a wind turbine component. As the size of wind turbines increases, so does the size and weight of wind turbine components, such as the wind turbine components mentioned above. Thereby it becomes increasingly difficult to handle such wind turbine components. For instance, heavy counter-weights may be required in order to hoist or lower the wind turbine components to or from the nacelle.

U.S. Pat. No. 6,750,559 B2 discloses a wind power plant comprising a tower and a housing that is mounted onto the tower. The wind power plant further has a container functioning to receive structural parts, whereby the container can be moved underneath an opening on the underside of the housing.

DE 10 2007 062 622 A1 discloses a wind turbine comprising a tower and a nacelle mounted on the tower. The nacelle comprises a machine housing, in which the drive train of the wind turbine is arranged, and a housing module, in which electrical operating means of the wind turbine are arranged. The housing module is connected to the machine housing.

DESCRIPTION OF THE INVENTION

It is an object of embodiments of the invention to provide a wind turbine in which wind turbine components can be hoisted to and lowered from the wind turbine without the need for an external crane.

It is a further object of embodiments of the invention to provide a wind turbine in which wind turbine components can be hoisted to and lowered from the wind turbine without the need for counterweights.

According to a first aspect the invention provides a wind turbine comprising:
 a tower,
 a nacelle mounted on the tower, and
 a movable container mounted on a lower part of the nacelle, the movable container housing a hoisting mechanism for hoisting and/or lowering the movable container and for hoisting and/or lowering wind turbine components.

Thus, according to the first aspect, the invention provides a wind turbine comprising a tower and at least one nacelle mounted on the tower. It should be noted that the wind turbine according to the first aspect of the invention may have only one nacelle mounted on the tower. In this case the nacelle may advantageously be mounted on top of the tower. Such wind turbines are sometimes referred to as 'single rotor wind turbines'.

As an alternative, the wind turbine according to the first aspect of the invention may have two or more nacelles mounted on the tower. Such wind turbines are sometimes referred to a 'multi rotor wind turbines'. In this case the tower may be provided with one or more arms extending away from a main tower part, each arm carrying one or more nacelles.

In the following, reference to 'the nacelle' should be interpreted to mean the nacelle mounted on top of the tower in the case that the wind turbine is a single rotor wind turbine, and one of the two or more nacelles mounted on the tower in the case that the wind turbine is a multi rotor wind turbine.

The wind turbine further comprises a movable container mounted on a lower part of the nacelle. The movable container houses a hoisting mechanism for hoisting and/or lowering the movable container and for hoisting and/or lowering wind turbine components.

In the present context the term 'wind turbine component' should be interpreted to mean any suitable component of the wind turbine, which it may be required to hoist to or lower from a position near, at or inside the nacelle. The wind turbine component could, e.g., be a drive train component, such as a main bearing, a main shaft, a gearbox or a generator, a part of a drive train component, e.g. a stage of a gearbox, etc. Alternatively, the wind turbine component could be a hub, a wind turbine blade, a rotor, or any other suitable kind of wind turbine component.

The movable container could, e.g., be a standard container which can easily be mounted on a truck or a flatbed in order to transport the container, along with its contents, to a wind turbine site.

Thus, in the wind turbine according to the first aspect of the invention, a wind turbine component can be hoisted towards and/or lowered from the nacelle, using the hoisting mechanism which is arranged in the movable container. Since the movable container is mounted on the lower part of the nacelle, the movable container will be pushed against the lower part of the nacelle during hoisting or lowering of a wind turbine component, and the lower part of the nacelle will therefore provide a counteracting force on the movable container. Thereby a separate counterweight on the ground is not required, even in the case that the wind turbine component being hoisted or lowered is very heavy. This is a great advantage, because providing appropriate counterweights at a wind turbine site may be very cumbersome, and it may add considerably to the costs involved in mounting or unmounting a wind turbine component. Furthermore, the need for an external crane is avoided, since the wind turbine component is hoisted and/or lowered by means of the hoisting mechanism accommodated in the movable container.

A further advantage is that the structure of the wind turbine, in particular the structure of the tower, may be dimensioned for stability in high wind situations, these properties being transferred to the hoisting mechanism. This means that the operating window of the crane is relatively large, allowing for the operations to be done at any time without having to worry about the weather window.

The hosting mechanism arranged in the movable container is further capable of hoisting and/or lowering the movable container. Thus, the hoisting mechanism is able to hoist itself, along with the movable container accommodating the hoisting mechanism, from a position on the ground to the mounting position on the lower part of the nacelle, and/or to lower itself and the movable container from the mounting position to a position on the ground. Thus, the hosting mechanism can be provided at the position at the lower part of the nacelle, thereby allowing the lower part of the nacelle to provide a counterweight function, without the need for an external crane.

The movable container may further house cables for use during hoisting and/or lowering of a wind turbine component. According to this embodiment, the movable container houses everything which is required in order to hoist and/or lower a wind turbine component, and all of this equipment can therefore be delivered as a single unit, and hoisted to the mounting position on the lower part of the nacelle as a single unit. Once the movable container has been mounted on the lower part of the nacelle, the cables can easily be attached to a wind turbine component to be hoisted or lowered.

The hoisting mechanism may be or comprise at least one winch. A winch is a very simple and low cost hoisting mechanism, and it is therefore an advantage to use a winch for mounting or unmounting a wind turbine component.

The hoisting mechanism may comprise at least two winches being operable in a coordinated manner during hoisting and/or lowering of the movable container and/or a wind turbine component. According to this embodiment, the combined lifting capability of the at least two hoisting mechanisms can be used for moving the wind turbine component to be hoisted and/or lowered. Thereby even very heavy wind turbine components can be hoisted or lowered, without requiring a single hoisting mechanism with a correspondingly high lifting capability. Accordingly, this allows a high total lifting capability to be obtained from smaller, less expensive, hoisting mechanisms. Furthermore, hoisting or lowering the wind turbine component by coordinated operation of two or more hoisting mechanisms allows the wind turbine component to be stabilised during hoisting or lowering.

The lower part of the nacelle may be provided with a mounting interface configured to receiving a matching mounting interface provided on the movable container, thereby allowing the movable container to be detachably mounted on the lower part of the nacelle. According to this embodiment, the movable container can be hoisted from a position on the ground to the mounting position on the lower part of the nacelle and attached thereto, when the hoisting mechanism accommodated in the movable container is required at the nacelle. When the hosting mechanism is no longer required, the movable container may be detached from the lower part of the nacelle and lowered towards the ground. However, the movable container may also remain mounted on the lower part of the nacelle during periods where the hoisting mechanism is not required. This also allows a movable container to be fitted onto existing wind turbines which may be retrofitted with a mounting interface on the lower part of the nacelle.

The mounting interfaces of the nacelle and the movable container may comprise an automatic locking mechanism which provides automatic locking of the movable container to the lower part of the nacelle when the mounting interfaces are moved into contact with each other. According to this embodiment, the movable container and the lower part of the nacelle are automatically locked together, thereby mounting the movable container on the lower part of the nacelle, when the movable container is hoisted towards the lower part of the nacelle. This provides a very easy and reliant way of mounting the movable container on the lower part of the nacelle, and the presence of service personnel in the nacelle during mounting of the movable container on the lower part of the nacelle is not required.

The lower part of the nacelle may be provided with a hatch allowing wind turbine components to pass there through. According to this embodiment, wind turbine components can be hoisted directly from a lower position, e.g. a position on the ground, and into the interior of the nacelle, or lowered directly from the interior of the nacelle and towards the ground, via the hatch.

The wind turbine may further comprise one or more cable guiding structures arranged in an interior part of the nacelle or on an outer part of the nacelle, and the hoisting mechanism may be connectable to a wind turbine component via the cable guiding structure(s) in order to move the wind turbine component in the nacelle by means of the hoisting mechanism.

According to this embodiment, the cable(s) which interconnect the hoisting mechanism and the wind turbine component to be hoisted or lowered are arranged along a path which includes the position(s) of the cable guiding structure(s). In the present context the term 'cable guiding structure' should be interpreted to mean a structure which is capable of guiding a cable or a similar structure in order to allow the cable to be arranged along a desired path.

At least one of the cable guiding structures may be provided with at least one pulley. In this case, a cable may advantageously be arranged along the pulley(s).

The cable guiding structure(s) may be arranged in an interior part of the nacelle, e.g. mounted on a load carrying frame of the nacelle. In this case, loads related to the movement of the wind turbine component are at least partly transferred to the load carrying frame of the nacelle, via the cable guiding structure(s). The load carrying frame of the nacelle is normally capable of handling loads of this order of magnitude, and of transferring the loads in an appropriate manner to the tower. Accordingly, it is hereby ensured that the loads related to the movement of the wind turbine component are handled in an appropriate manner, and that no excessive loads are applied to various parts of the wind turbine. The cable guiding structure(s) may advantageously be attached to one or more node points of the load carrying frame of the nacelle, since such node points are very suitable for handling loads in the manner described above. In the case that the cable guiding structure(s) is/are arranged in an interior part of the nacelle, the wind turbine component being moved may advantageously be a wind turbine component being accommodated in the interior part of the nacelle, such as a drive train component or an electrical cabinet.

As an alternative, the cable guiding structure(s) may be arranged on an outer part of the nacelle. In this case it may also be mounted directly on a load carrying frame of the nacelle. In this case the wind turbine component being moved may advantageously be a wind turbine component being arranged outside the nacelle, such as a hub or a wind turbine blade.

Thus, the wind turbine component may be a drive train component. In the present context the term 'drive train component' should be interpreted to mean a component of the wind turbine which forms part of the drive train of the wind turbine. For instance, the drive train component could be or form part of a main bearing, a main shaft, a gearbox or a generator.

For instance, the drive train component could be in the form of one or more stages of a gearbox.

Alternatively, the wind turbine component may be or form part of a transformer, an electrical cabinet, a hub, a wind turbine blade or any other suitable kind of wind turbine component.

The movable container may comprise one or more wheels configured to allow the movable container to roll against the tower during hoisting and/or lowering of the movable container. According to this embodiment, the movable container rests against the tower as it is being hoisted to or lowered from the mounting position on the lower part of the nacelle. Thereby the movement of the movable container is guided, thereby allowing the movable container to be hoisted or lowered in a secure manner, e.g. minimising the risk of collisions between the movable container and other structures, such as the tower of the wind turbine. Furthermore, since this is obtained by allowing the wheels of the movable container to roll against the tower, essentially no friction will occur between the movable container and the tower, and the risk of damage to the movable container as well as to the tower is minimised.

According to a second aspect the invention provides a wind turbine comprising:
- a tower,
- a nacelle mounted on the tower, the nacelle being provided with a mounting interface at a lower part thereof, and
- a movable container suspended below the nacelle, the movable container housing a hoisting mechanism for hoisting and/or lowering the movable container and for hoisting and/or lowering wind turbine components, the movable container further being provided with a mounting interface which matches the mounting interface of the nacelle, thereby allowing the movable container to be detachably mounted on the lower part of the nacelle.

The wind turbine according to the second aspect of the invention is very similar to the wind turbine according to the first aspect of the invention, and the remarks set forth above with reference to the first aspect of the invention are therefore equally applicable here.

However, in the wind turbine according to the second aspect of the invention, the movable container is not mounted at the mounting position on the lower part of the nacelle. Instead the movable container is suspended below the nacelle. Accordingly, the movable container may either be in the process of being hoisted towards the mounting position on the lower part of the nacelle, or in the process of being lowered from the mounting position towards the ground.

Accordingly, the movable container may be arranged at a distance from the lower part of the nacelle. This should be interpreted to mean that the movable container is positioned between the ground and the lower part of the nacelle, without abutting the lower part of the nacelle.

For instance, the distance between the movable container and the lower part of the nacelle may be sufficient to allow objects to pass between the movable container and the lower part of the nacelle.

As described above, the movable container may be in the process of being moved towards or away from the nacelle by means of the hoisting mechanism.

According to a third aspect the invention provides a method for moving a wind turbine component of a wind turbine comprising a tower and a nacelle mounted on the tower, the method comprising the steps of:

- providing a movable container housing a hoisting mechanism, and arranging the movable container at a lower part of the tower,
- interconnecting the movable container and at least one anchoring point on the ground by means of at least one tag line,
- interconnecting the hoisting mechanism and at least one connecting point at the nacelle by means of at least one cable,
- hoisting the movable container to a position at a lower part of the nacelle, using the hoisting mechanism and the tag line(s),
- mounting the movable container at the lower part of the nacelle,
- connecting the hoisting mechanism to a wind turbine component to be moved, and
- moving the wind turbine component by means of the hoisting mechanism and the tag line(s).

The wind turbine may advantageously be a wind turbine according to the first or second aspect of the invention, and the remarks set forth above are therefore equally applicable here.

In the method according to the third aspect of the invention, the movable container is initially positioned at a lower part of the tower, e.g. on the ground near the tower. The movable container is then connected to at least one anchoring point on the ground by means of at least one tag line, and the hoisting mechanism, arranged inside the movable container, is connected to at least one connection point at the nacelle by means of at least one cable.

The movable container is then hoisted to a position at a lower part of the nacelle, using the hoisting mechanism and the tag line(s). Thus, the hoisting mechanism hoists itself, along with the movable container accommodating the hoisting mechanism, from the lower part of the tower towards the nacelle. During the hoisting, the movement of the movable container is controlled by means of the tag line(s) interconnecting the movable container and the anchoring point(s) on the ground.

When the hoisting of the movable container has been completed, and the movable container thereby is positioned at the lower part of the nacelle, the movable container is mounted at the lower part of the nacelle. Accordingly, the movable container, including the hoisting mechanism accommodated therein, is now attached to the lower part of the nacelle.

The hoisting mechanism is then connected to a wind turbine component to be mounted or unmounted, and the wind turbine component is moved by means of the hoisting mechanism and the tag line(s), essentially in the manner described above. For instance, the wind turbine component may be hoisted towards or lowered from the nacelle.

The step of moving the wind turbine component may comprise lowering the wind turbine component from the nacelle towards the ground. According to this embodiment, the wind turbine component may, e.g., be a wind turbine component to be unmounted from the wind turbine.

Alternatively, the step of moving the wind turbine component may comprise hoisting the wind turbine component from the ground towards the nacelle. According to this embodiment, the wind turbine component may, e.g. be a wind turbine to be mounted in the wind turbine.

The hoisting mechanism may comprise at least two winches, and the step of hoisting the movable container and/or the step of moving the wind turbine component may comprise coordinated operation of the winches. As described above, this allows a high total lifting capability to be obtained from smaller, less expensive, hoisting mechanisms. Furthermore, a stable movement of the wind turbine component can be obtained.

The step of mounting the movable container at the lower part of the nacelle may comprise moving a mounting interface provided at the lower part of the nacelle and a matching mounting interface provided at the movable container into contact with each other. As described above, the mounting interfaces may be provided with an automatic locking mechanism, thereby allowing the movable container to be mounted on the lower part of the nacelle in an easy and reliable manner.

BRIEF DESCRIPTION OF THE DRAWINGS

The invention will now be described in further detail with reference to the accompanying drawings in which.

DETAILED DESCRIPTION OF THE DRAWINGS

Figure 1:
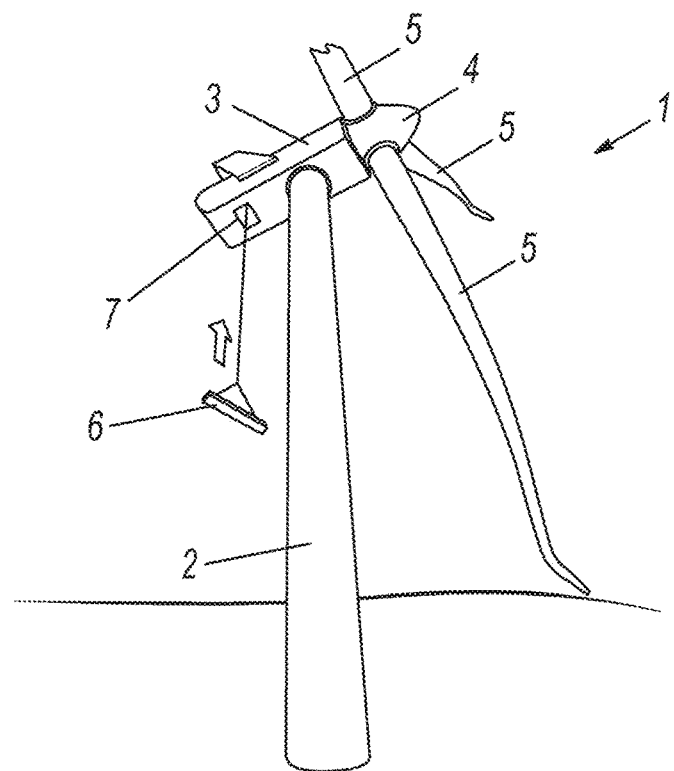
FIGS. 1-29 illustrate a wind turbine and a method according to an embodiment of the invention.

FIG. 1 is a perspective view of a single rotor wind turbine 1 according to an embodiment of the invention. The wind turbine 1 comprises a tower 2 and a nacelle 3 mounted on the tower 2. The wind turbine 1 further comprises a rotor 4 carrying three wind turbine blades 5. In FIG. 1 a rail module 6 is in the process of being hoisted towards the nacelle 3 in order to allow the rail module 6 to pass through a hatch 7 formed in a lower part of the nacelle 3. The rail module 6 may, e.g., be hoisted by means of an onboard crane (not visible) arranged in the nacelle 3.

Figure 2:
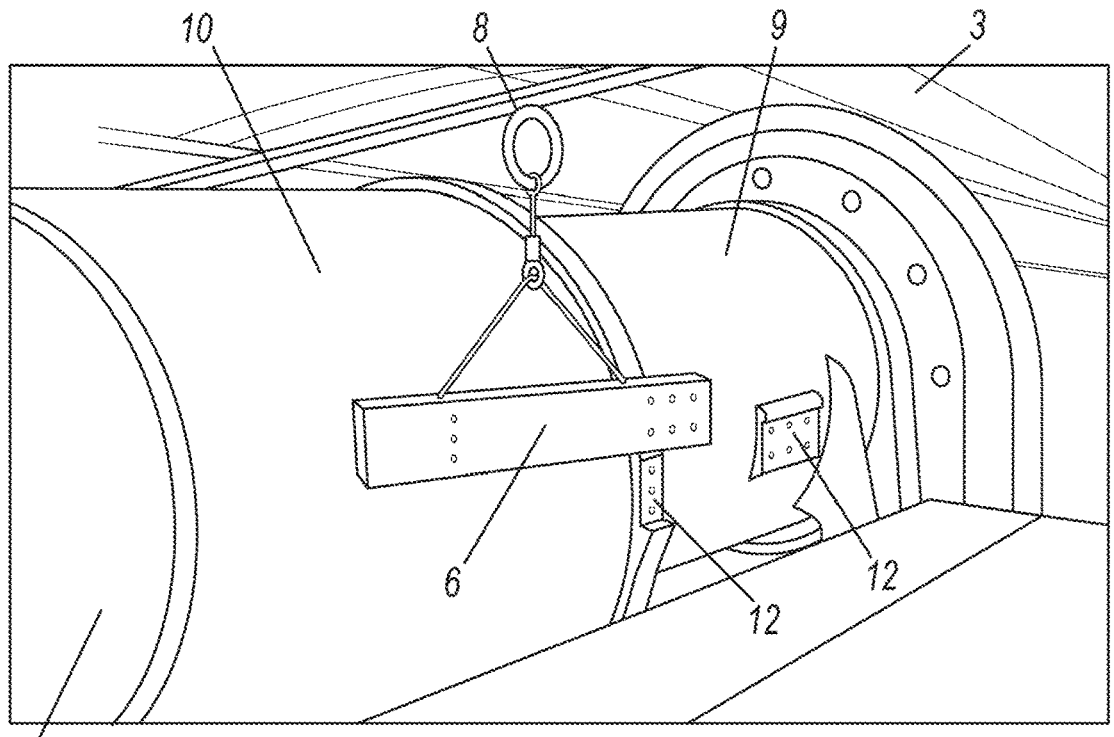

In FIG. 2 the rail module 6 has been hoisted to the nacelle 3, and is now being handled inside the nacelle 3 by means of an onboard crane 8. In particular, the rail module 6 is being moved along a drive train comprising a number of drive train components in the form of a main bearing housing 9, a gearbox 10 and a generator 11. The main bearing housing 9 houses a main bearing which rotatably supports the main shaft of the wind turbine, and the main shaft. The gearbox 10 houses a gear system.

The main bearing housing 9 is provided with interface portions 12 configured to have a rail module 6 attached thereto. This allows the rail module 6 to be mounted on the main bearing housing 9 accurately at a desired position and with a desired orientation or inclination with respect to the main bearing housing 9. Furthermore, it allows easy attachment of the rail module 6 to the main bearing housing 9.

It should be noted that the gearbox 10 and/or the generator 11 could be provided with similar interface portions, thereby allowing a rail module 6 to be attached to the gearbox 10 or to the generator 11. It is further noted that the interface portions 12 may also be used for attaching a sledge to one of the drive train components 9, 10, 11 in order to move the drive train component 9, 10, 11. This will be described in further detail below. In this case it is only necessary to provide a given drive train component 9, 10, 11 with a single kind of interface portion 12 in order to allow easy attachment of a rail module 6 as well as easy attachment of a sledge to the drive train component 9, 10, 11.

Figure 3:
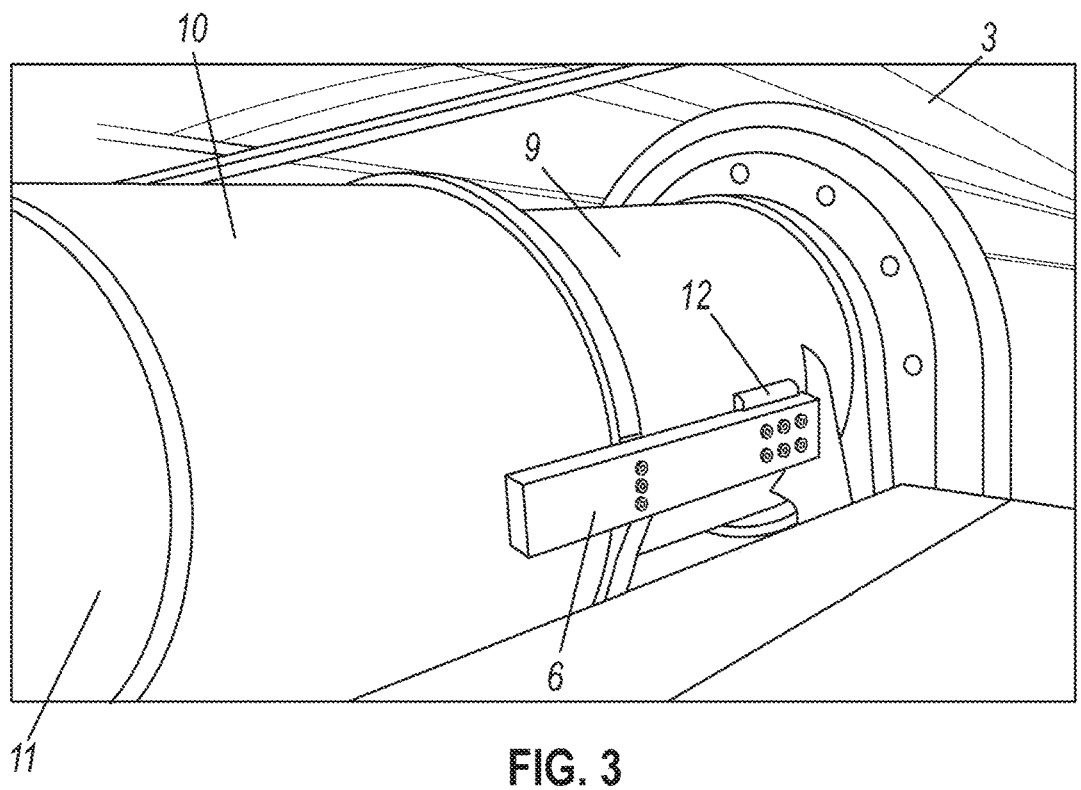

In FIG. 3 the rail module 6 has been bolted to the main bearing housing 9 at the interface portions 12. It can be seen that the orientation or inclination of the rail module 6 is determined by the position and design of the interface portions 12. It can also be seen that the orientation or inclination of the rail module 6 is such that it extends along a direction which is substantially parallel to a longitudinal direction of the drive train, i.e. parallel to a direction defined by the main shaft of the wind turbine.

Figure 4:
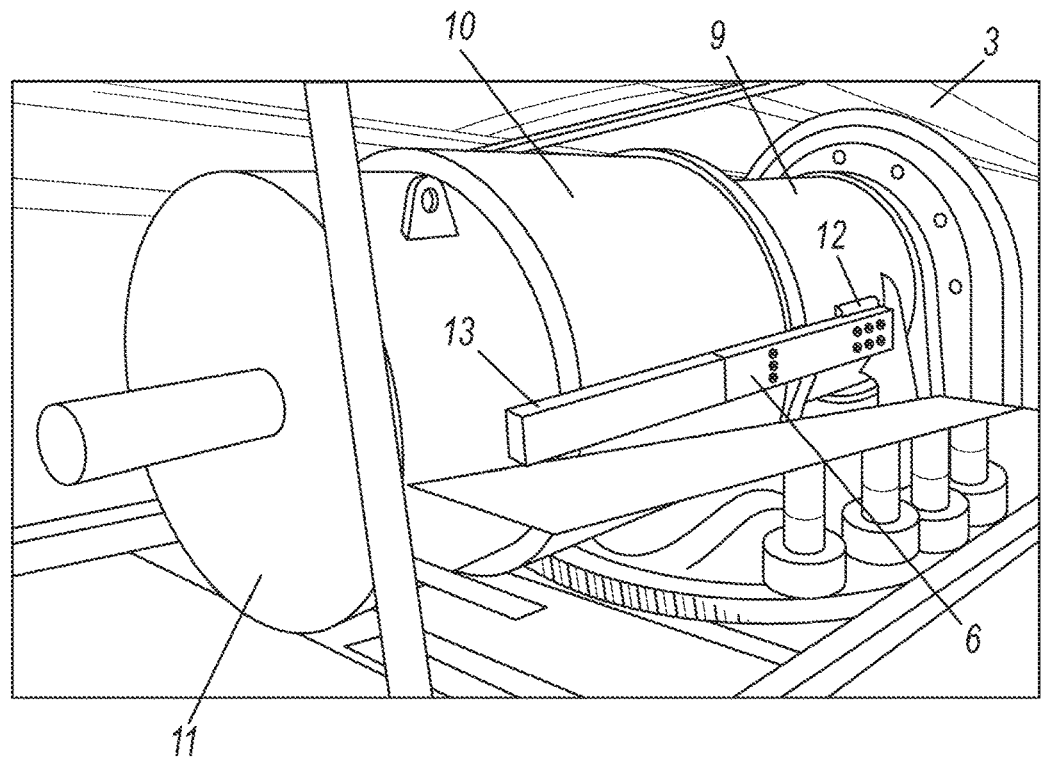

In FIG. 4 a second rail module 13 has been hoisted into the nacelle 3 and attached to an end part of the first rail module 6, which is illustrated in FIG. 3. Accordingly, the second rail module 13 is arranged in continuation of the first rail module 6, and the rail modules 6, 13 extend along the same direction.

The second rail module 13 is only attached to the first rail module 6, i.e. the second rail module 13 is not attached to the gearbox 10 or the generator 11. Thereby it is possible for the gearbox 10 and the generator 11 to move relative to the rail modules 6, 13. This will be described in further detail below.

Figure 5:
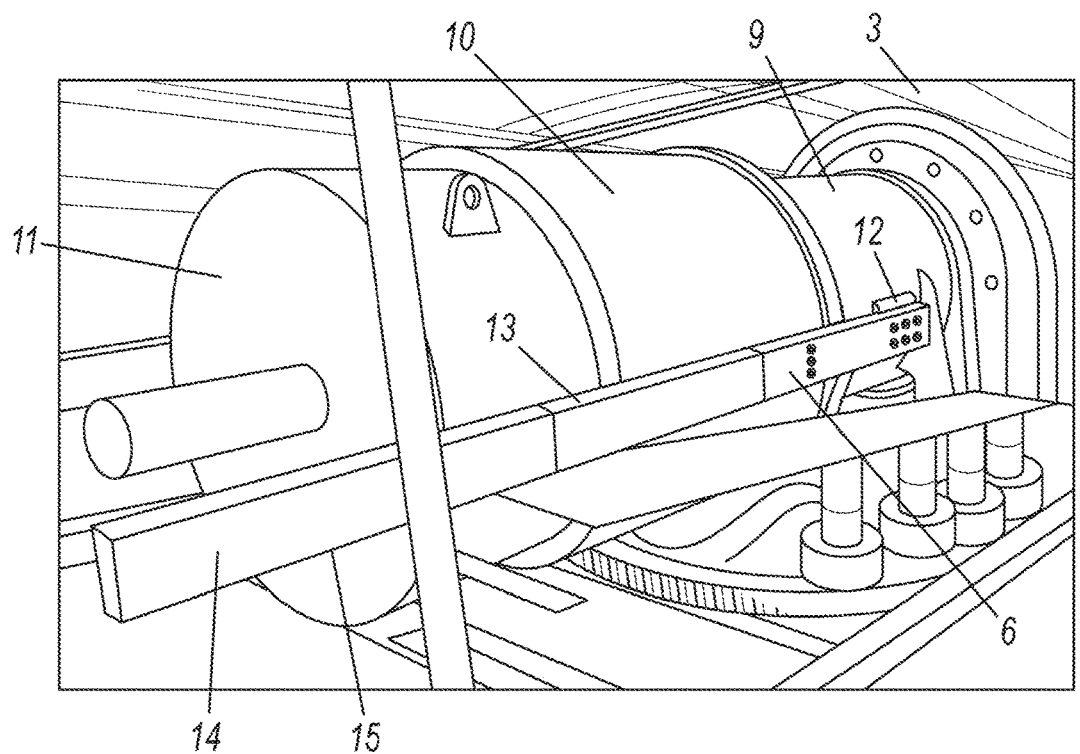

In FIG. 5 a third rail module 14 has been hoisted into the nacelle 3 and attached to an end part of the second rail module 13, in a similar manner as the second rail module 13 is attached to the first rail module 6. The three rail modules 6, 13, 14 thereby form a modular sliding rail 15 extending along a direction which is defined by the main shaft of the wind turbine.

It is an advantage that the sliding rail 15 is modular, because this allows the rail modules 6, 13, 14 to be provided and handled separately, and assembled to form the sliding rail 15 inside the nacelle 3. For instance, it is thereby possible to pass the rail modules 6, 13, 14 through the service hatch 7 of the nacelle 3, and the rail modules 6, 13, 14 can be handled by the onboard crane 8. Yet, it is still possible to form long sliding rails 15 capable of handling large and heavy drive train components 9, 10, 11, in a manner which will be described below.

Figure 6:
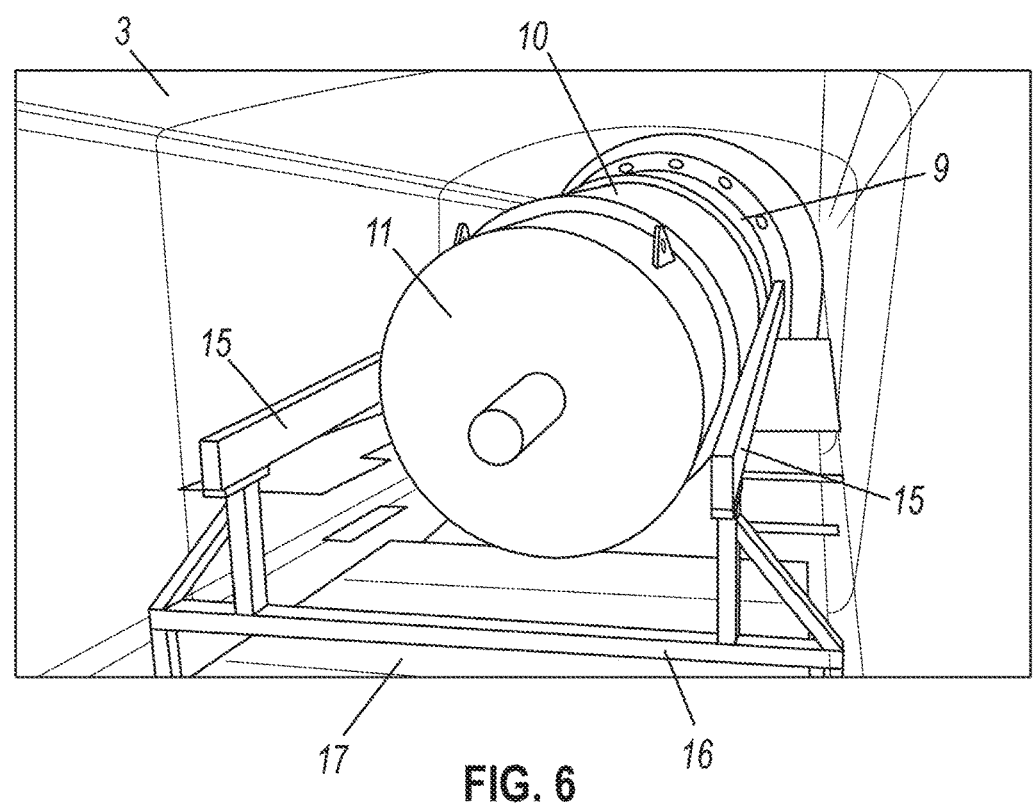

In FIG. 6 it can be seen that a corresponding modular sliding rail 15 has been assembled on the opposite side of the drive train. Thereby the sliding rails 15 extend in parallel on opposite sides of the drive train components 9, 10, 11, and at a level which is below the centre of gravity of the drive train components 9, 10, 11. This allows the drive train components 9, 10, 11 to be supported by the sliding rails 15 from below.

Furthermore, in FIG. 6 a support structure 16 has been arranged between a load carrying structure 17 of the nacelle 3 and end parts of the sliding rails 15 corresponding to free ends of the third rail modules 14. The support structure 16 ensures that the sliding rails 15 are supported on the load carrying structure 17 of the nacelle 3. Accordingly, the sliding rails 15 are each supported at one end by the connection between the first rail module 6 and the interface portion 12 of the main bearing housing 9, and at the opposite end by the support structure 16.

Figure 7:
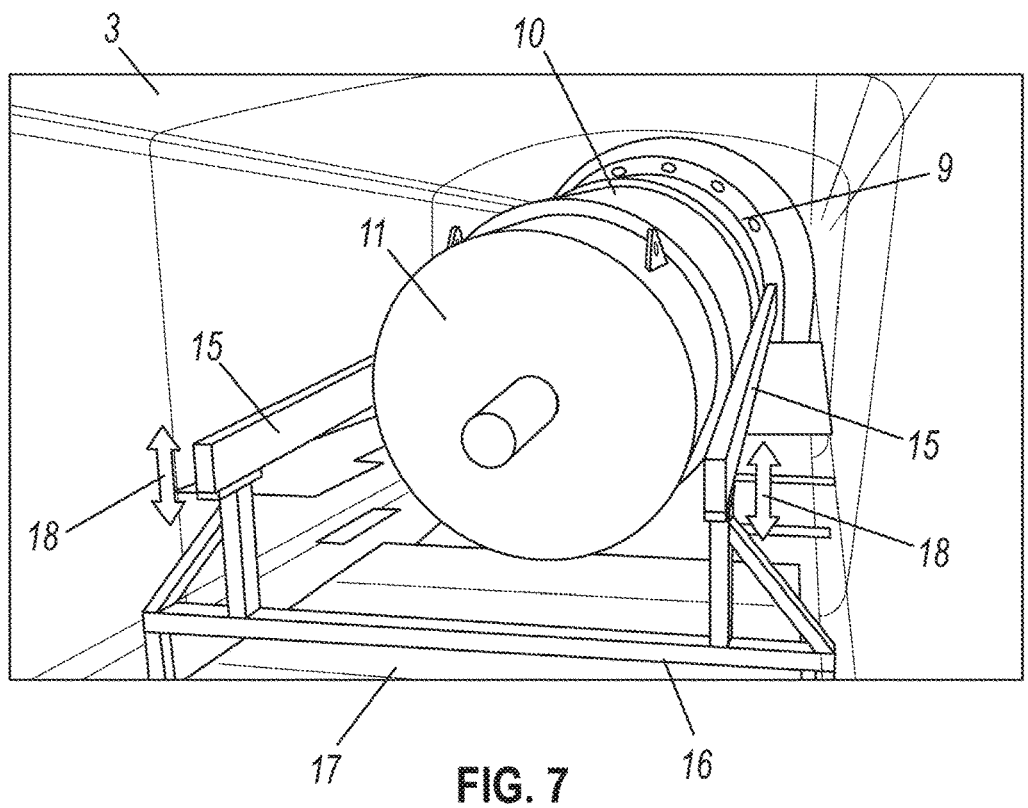

In FIG. 7 the inclination of the sliding rails 15 is adjusted as indicated by arrows 18. This could, e.g., be in order to ensure that the sliding rails 15 are accurately aligned with the direction defined by the main shaft of the wind turbine. The adjustment of the inclination could, e.g., take place manually, such as by rotating a threaded rod engaging a mating inner thread. As an alternative, the adjustment mechanism may comprise hydraulic pistons, and the adjustment may be performed by operating the hydraulic pistons.

Figure 8:
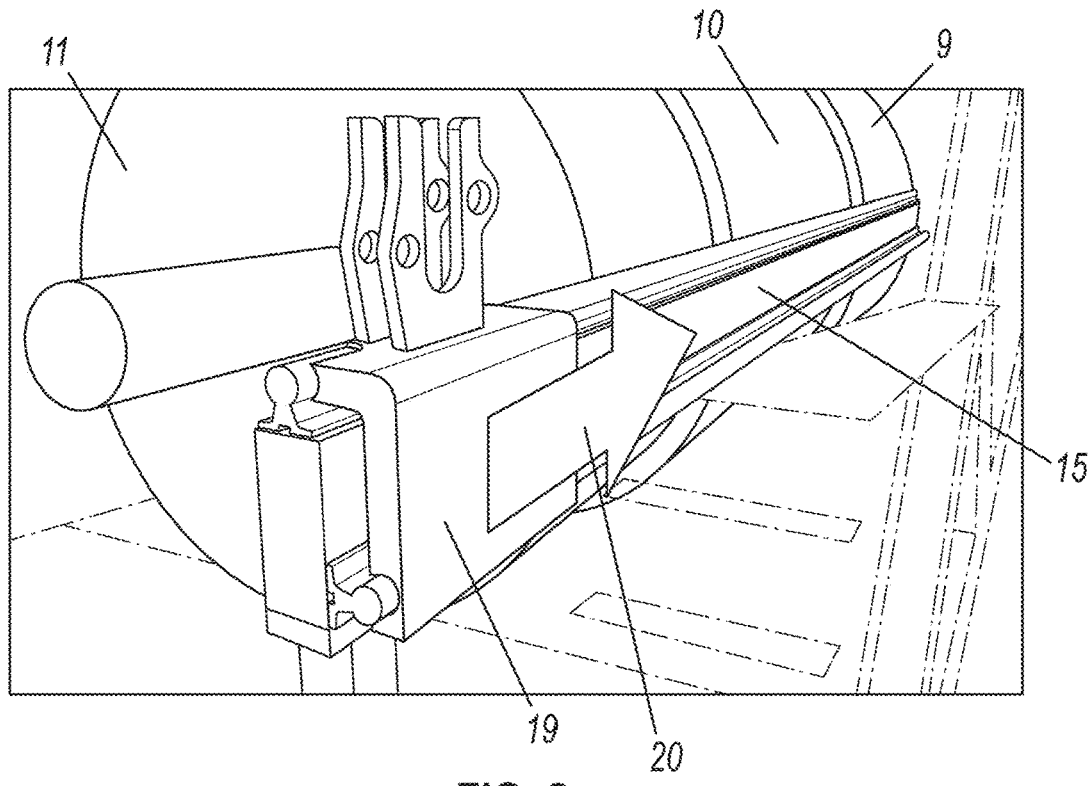

In FIG. 8 a part of a sledge 19 has been mounted on one of the sliding rails 15. Arrow 20 indicates that the sledge 19 can move along the length of the sliding rail 15, and that the sledge 19 has been pushed onto the sliding rail 15 at its free end. The sledge 19 is provided with a holding part 57 being configured to hold a relative position between a guiding part and a mating part of the sledge 19.

Figure 9:
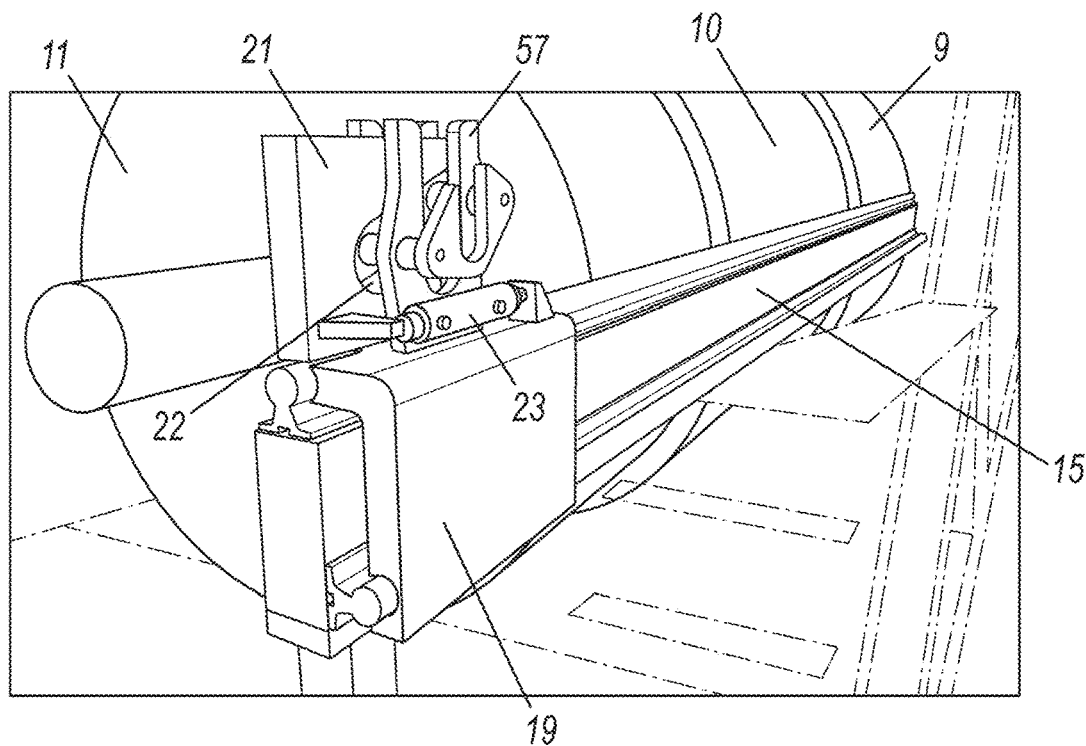

In FIG. 9 a guiding part 21 has been mounted on the sledge 19, the guiding part 21 being provided with a guiding track 22. The guiding track 22 is inclined with respect to the longitudinal direction of the sliding rail 15. This will be described in further detail below. The guiding part 21 can be moved with respect to the sledge 19 by means of piston 23.

Figure 10:
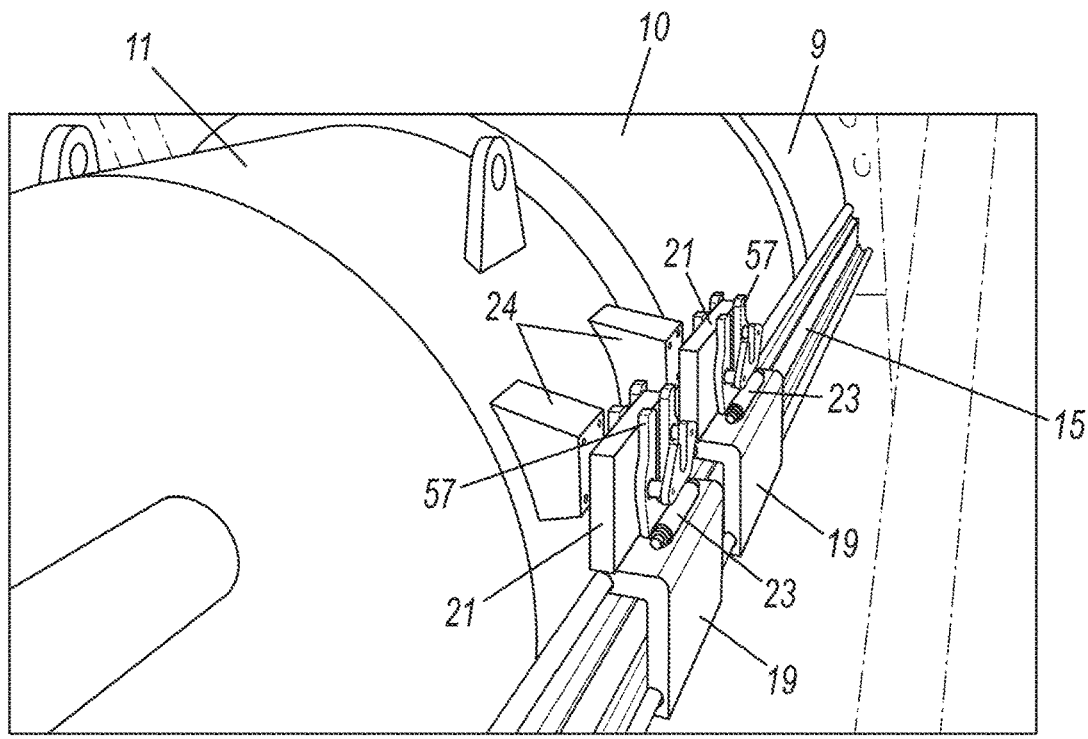

In FIG. 10 an additional sledge 19, including a guiding part 21, has been mounted movably on the sliding rail 15. Furthermore, two interface portions 24 have been attached to the generator 11, and the sledges 19 have been moved along the sliding rail 15 to positions corresponding to the positions of the interface portions 24.

Figure 11:
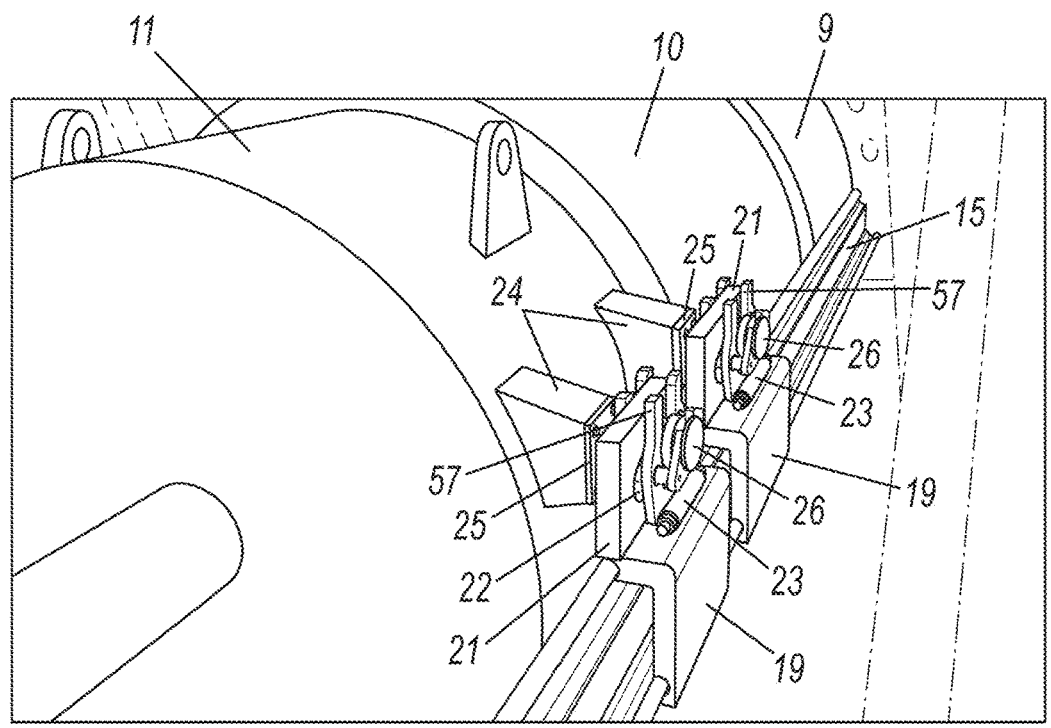

In FIG. 11 a mating part 25 has been mounted on each of the interface portions 24. Each mating part 25 is provided with a protruding part 26 which is arranged in engagement with the guiding track 22 of the guiding part 21 of one of the sledges 19. Since the mating parts 25 are attached to the interface portions 24 they are fixed relative to the generator 11.

When the guiding part 21 of one of the sledges 19 is moved relative to the sledge 19, in particular relative to the holding part 57, by means of the piston 23, the guiding part 21 will also move relative to the corresponding mating part 25. This will cause a corresponding relative movement between the guiding track 22 and the protruding part 26 engaging the guiding track 22. This will cause the protruding part 26 to follow the path defined by the guiding track 22. Since the guiding track 22 is inclined relative to the longitudinal direction of the sliding rail 15, the movement of the protruding part 26 along the guiding track 22 differs from a linear movement along the sliding rail 15. Thereby the orientation of the generator 11 can be adjusted by performing relative movements between the guiding parts 21 and the sledges 19. The holding part 57 ensures that no relative movements between the guiding part 21 and the mating part 25 take place whenever such relative movements are not desired. Thereby it is ensured that a given relative position between the guiding part 21 and the mating part 25, and thereby a given orientation if the generator 11, can be maintained.

If the guiding part 21 of one of the sledges 19 shown in FIG. 11 is moved, while the other one is not moved or is moved in an opposite direction, then the generator 11 will be tilted in such a manner that a rotational axis defined by the generator 11 is tilted relative to the direction defined by the main shaft of the wind turbine.

If the guiding parts 21 of both of the sledges 19 shown in FIG. 11 are moved in the same direction while the guiding part 21 of one or more similar sledges arranged on the opposite sliding rail 15 (not visible in FIG. 11) is not moved or is moved in an opposite direction, then the generator 11 will be rotated about an axis defined by the main shaft of the wind turbine.

If the guiding parts 21 of all of the sledges 19 are moved in the same direction, the generator 11 will be moved in a translational manner in an upwards or downwards direction.

Accordingly, the generator 11, or one of the other drive train components 9, 10, can be adjusted with respect to six degrees of freedom by means of only three sledges 19, two of the sledges 19 being arranged on one side of the drive train component 9, 10, 11, as shown in FIG. 11, and the third being arranged on the opposite side of the drive train components 9, 10, 11. This is obtained in an easy and uncomplicated manner by means of the guiding tracks 22 and the protruding parts 26 arranged in engagement with the guiding tracks 22.

Figure 12:
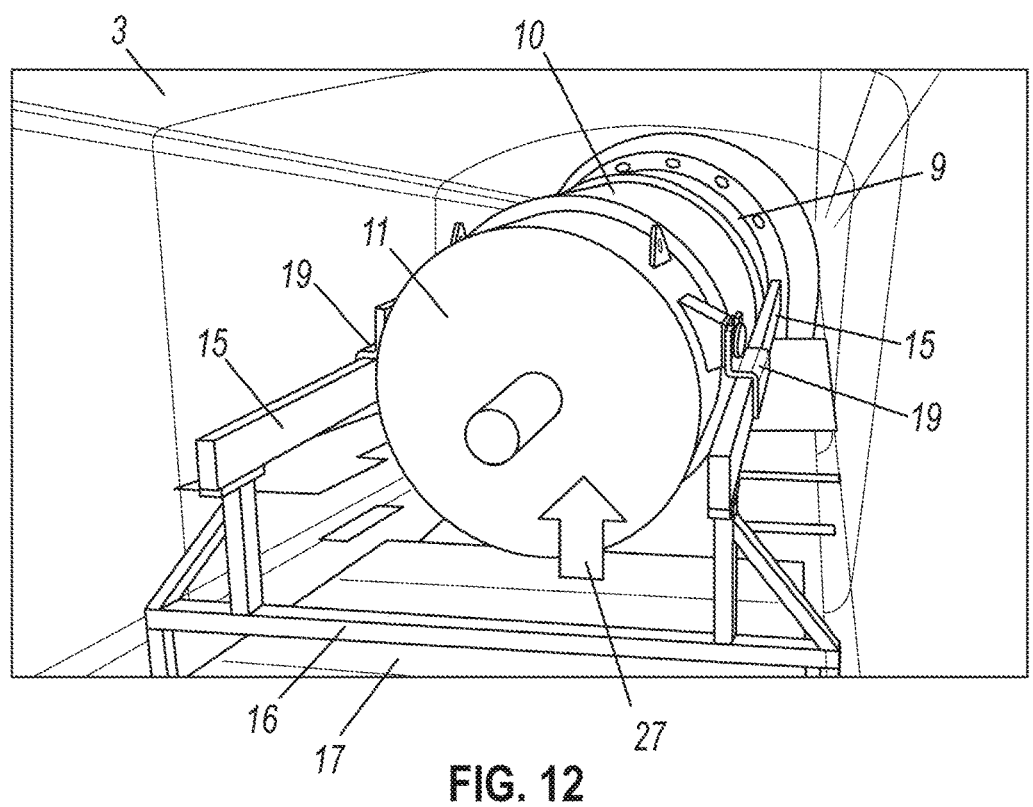

FIG. 12 illustrates part of the floor 17 of the nacelle 3 being removed, as indicated by arrow 27. This is in order to allow drive train components 9, 10, 11 to pass through a lower part of the nacelle 3.

Figure 13:
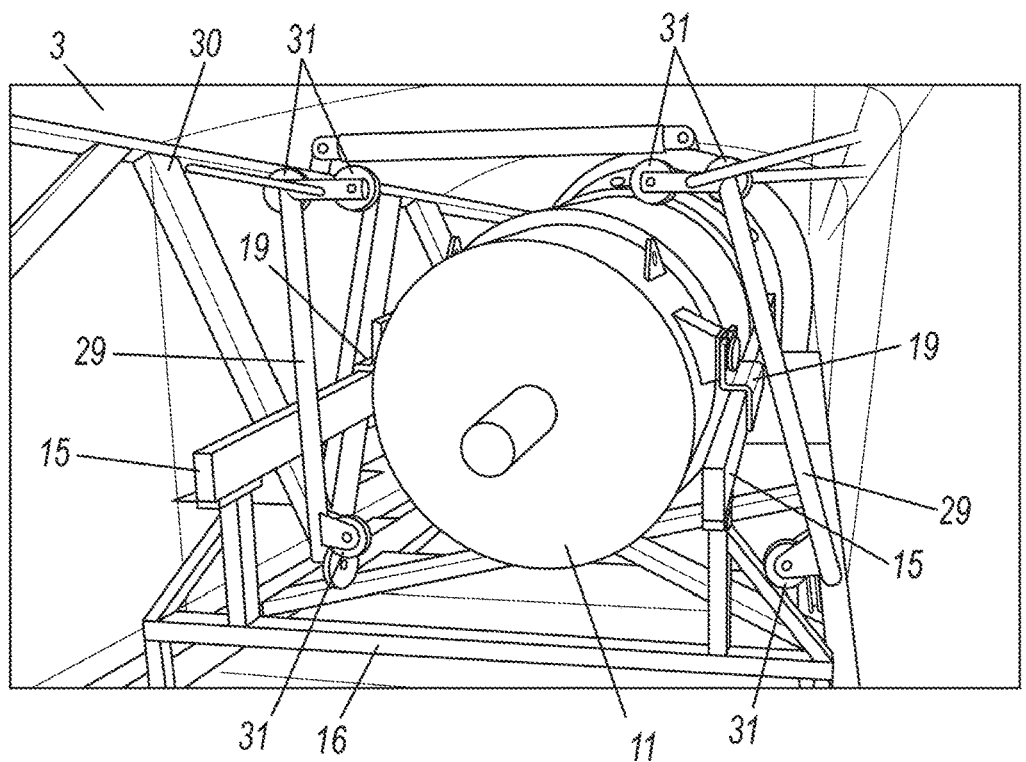

In FIG. 13, two cable guiding structures 29 have been mounted on a load carrying frame 30 of the nacelle 3. Each cable guiding structure 29 is provided with three pulleys 31 arranged for receiving and guiding a cable.

Figure 14:
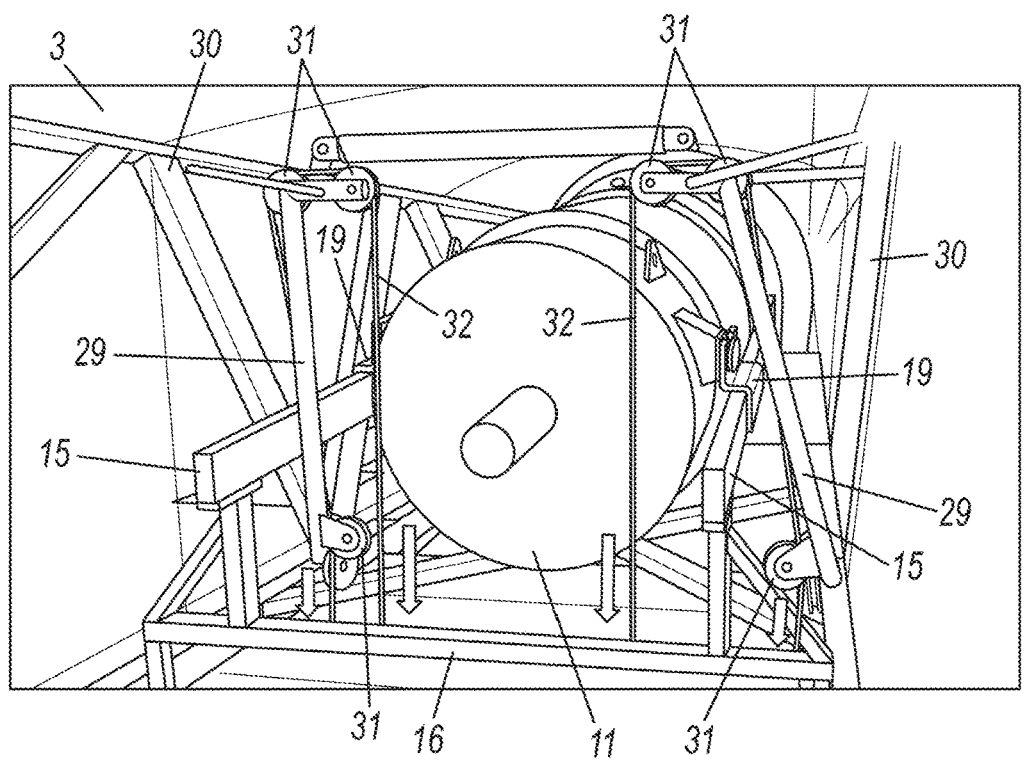

In FIG. 14, cables 32 have been mounted on the pulleys 31 of the cable guiding structures 29, and are lowered through the lower part of the nacelle 3. The cables 32 could, e.g., be in the form of tag lines. Furthermore, one end of each cable 32 may be connected to a hoisting mechanism, such as a winch.

Figure 15:
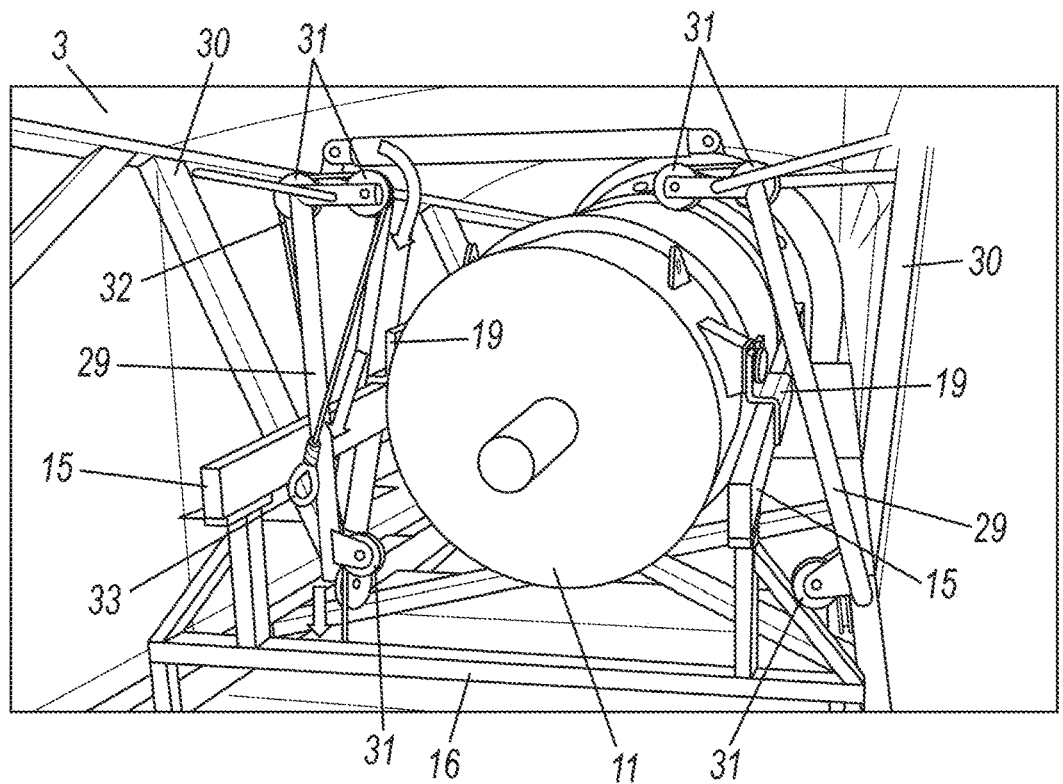

In FIG. 15 one of the cables 32 has been connected to a hoisting mechanism at one end and to an eyelet 33 formed on the cable guiding structure 29 at the other end. This allows the hoisting mechanism to hoist itself towards the nacelle 3. This will be described in further detail below.

Figure 16:
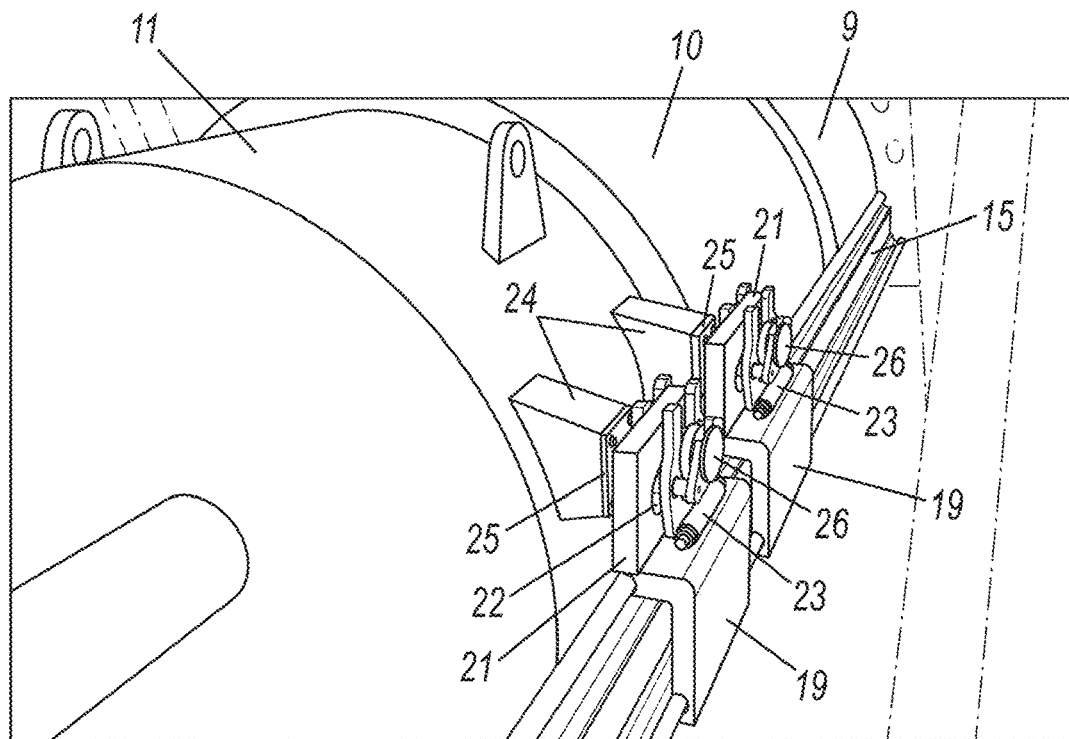

FIG. 16 illustrates a situation similar to the situation illustrated in FIG. 11. However, in FIG. 16 the generator 11 has been detached from the gearbox 10, and thereby from the rest of the drive train. Accordingly, the generator 11 is now carried by the sledges 19 and the sliding rail 15, and it is possible to move the generator 11 relative to the main bearing housing 9 and the gearbox 10, by means of the sledges 19.

Figure 17:
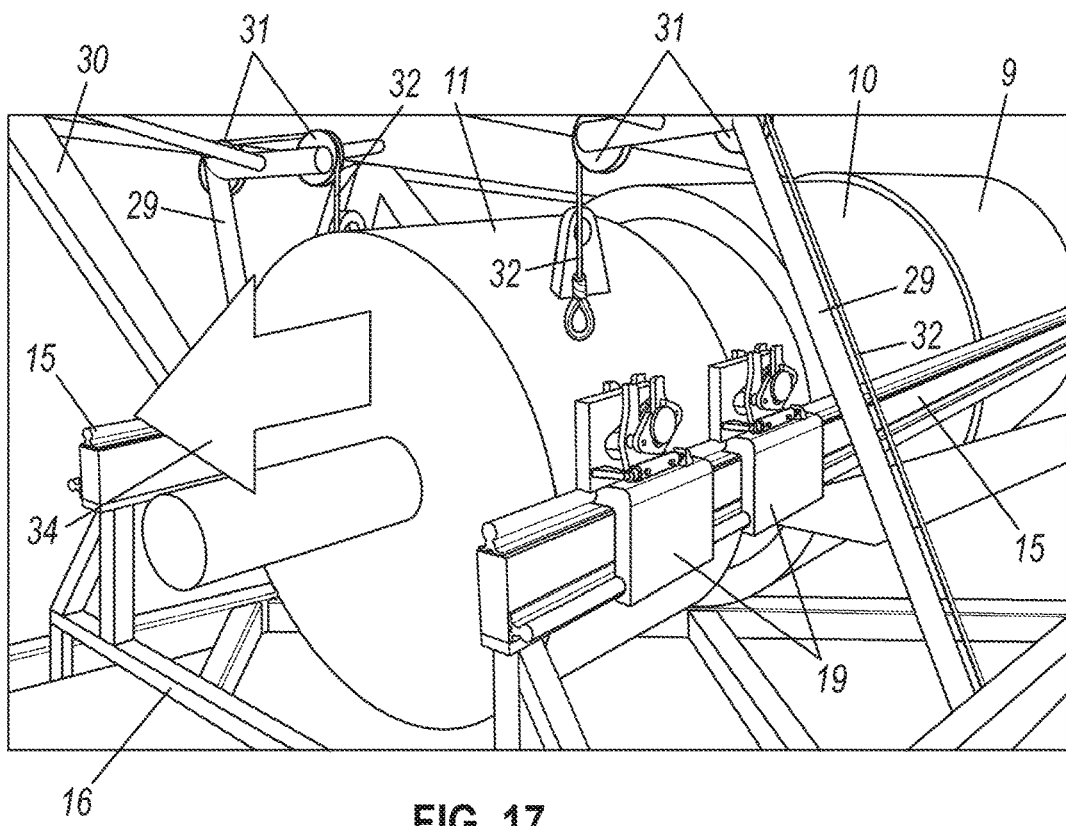

In FIG. 17 the generator 11 is in the process of being moved away from the main bearing housing 9 and the gearbox 10 as indicated by arrow 34. The generator 11 is moved along the sliding rails 15 due to the sledges 19 sliding along the sliding rails 15. Since the sliding rails 15 are essentially aligned with a direction defined by the main shaft of the wind turbine, the generator 11 is moved essentially along this direction.

Figure 18:
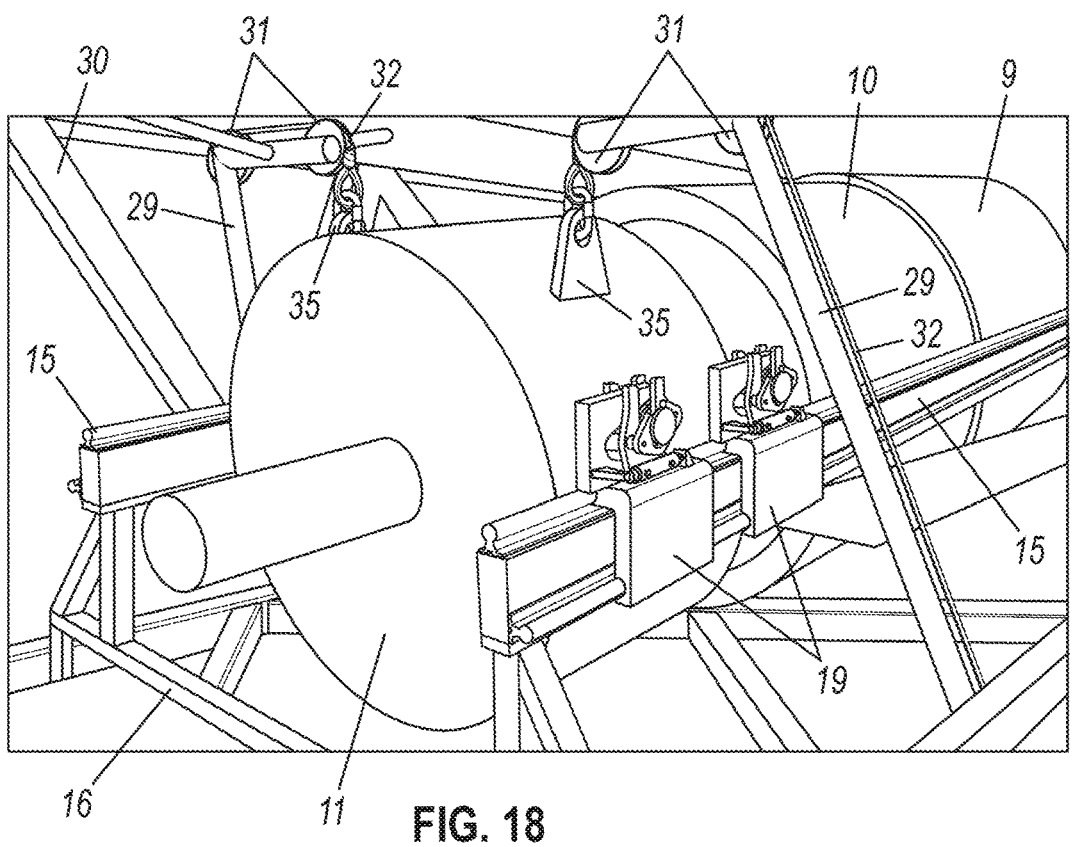

In FIG. 18 the movement of the generator 11 along the sliding rails 15 has been completed, and the generator 11 has thereby been moved to a position where it is free of the gearbox 10, i.e. it is no longer connected to the rest of the drive train. Furthermore, the cables 32 have been connected to the generator 11 via connecting parts 35. Thereby the generator 11 is connected to the hoisting mechanism, via the cables 32.

Figure 19:
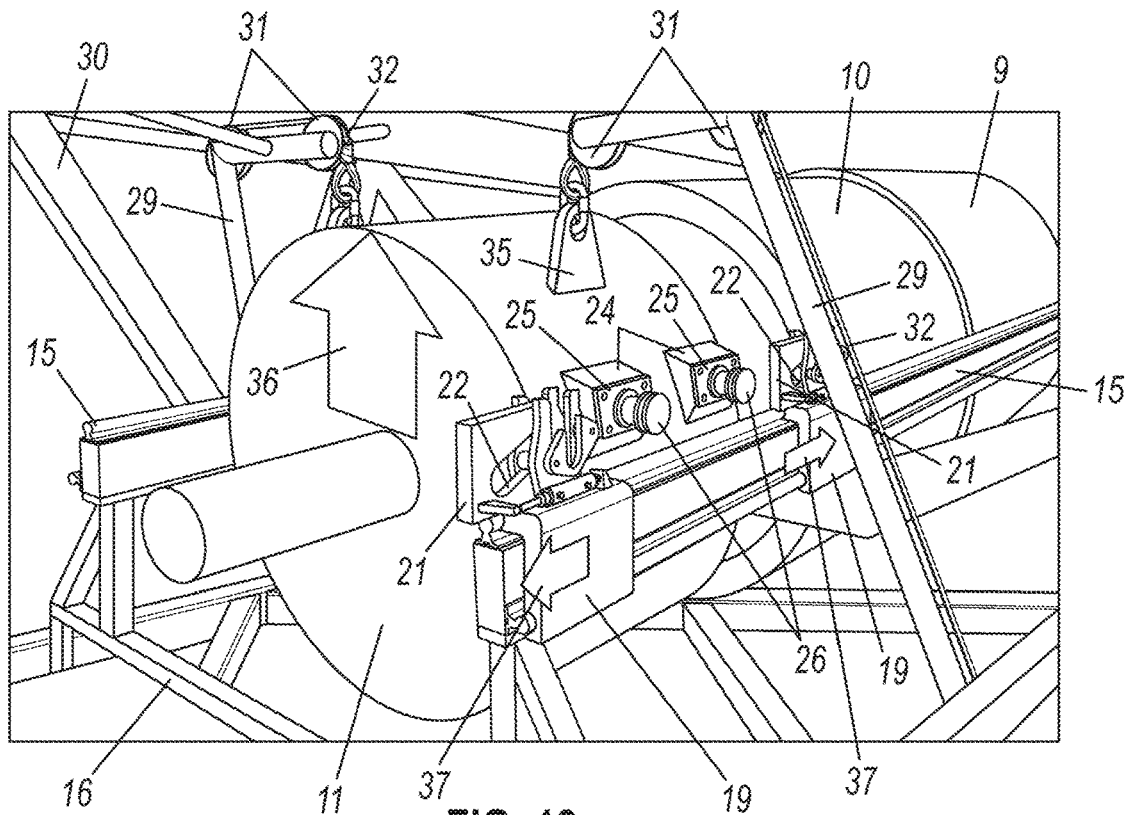

In FIG. 19 the generator 11 has been lifted upwards, as indicated by arrow 36, by means of the hoisting mechanism and the cables 32. Thereby the protruding part 26 of the mating part 25 of each sledge 19 has been moved out of engagement with the guiding track 22 of the guiding part 21. Thus, the generator 11, with the mating parts 25 attached thereto, is now free to move relative to the guiding parts 21. Accordingly, the sledges 19, along with the guiding parts 21, have been moved along the sliding rails 15, away from the mating parts 25, as indicated by arrows 37.

Figure 20:
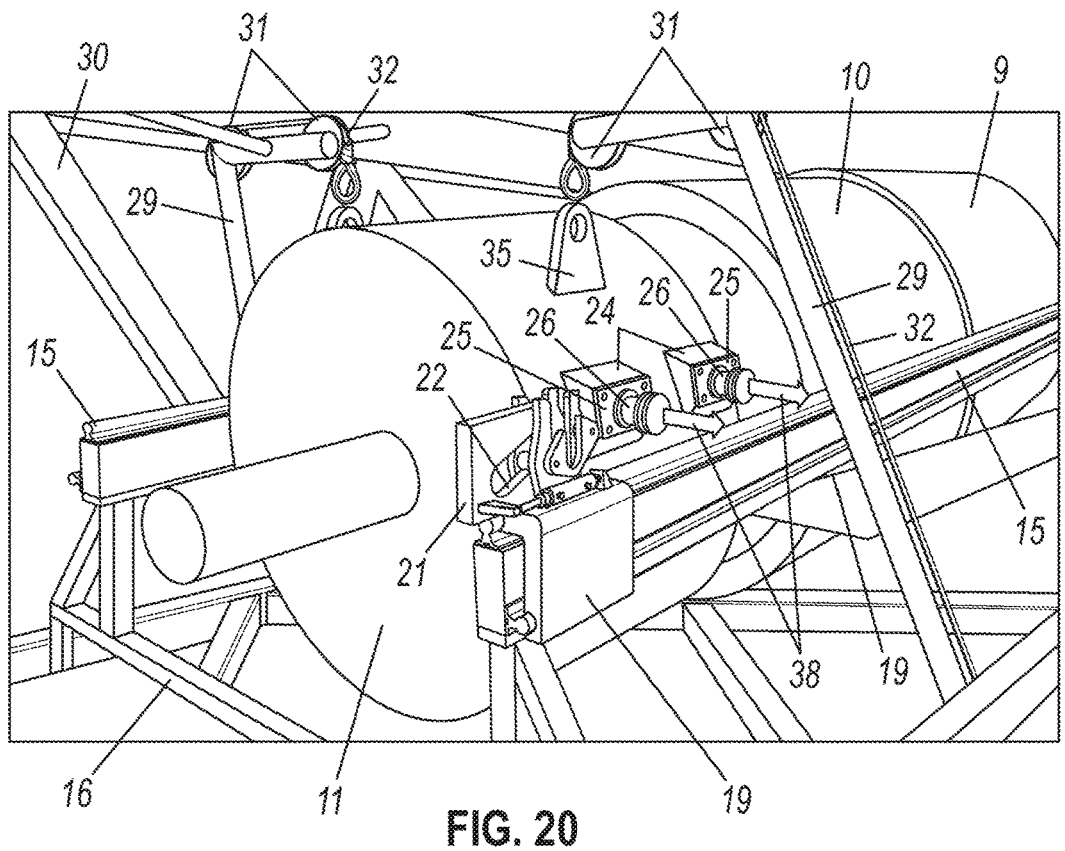

In FIG. 20 the mating parts 25 are in the process of being removed from the interface portions 24, as indicated by arrows 38. This will allow the generator 11 to pass the sliding rails 15 in a downwards direction.

Figure 21:
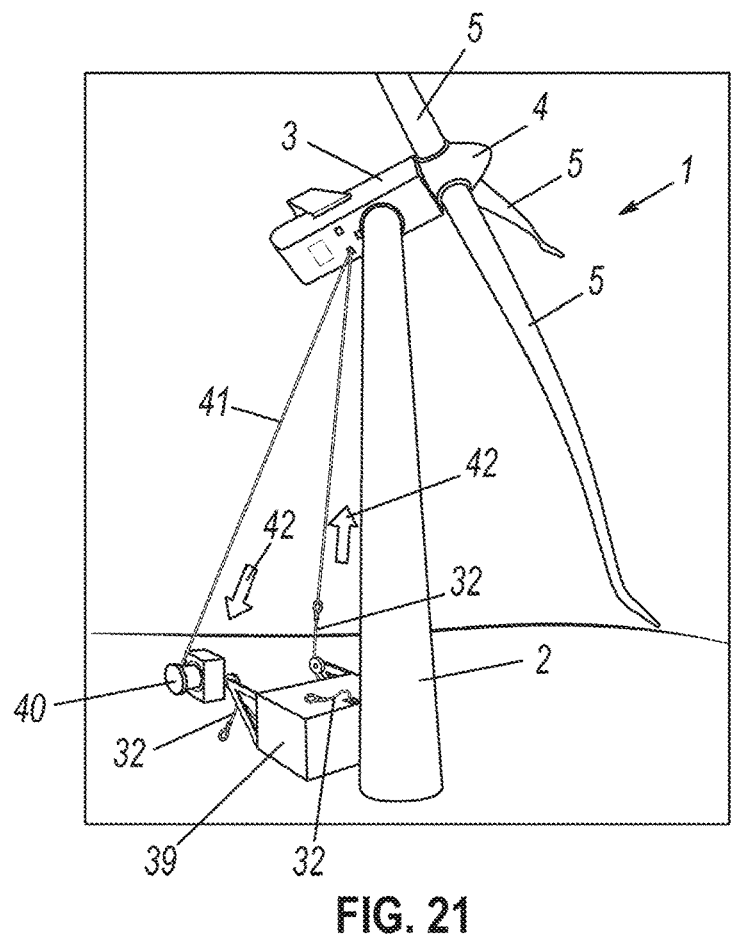

FIG. 21 is a perspective view of the wind turbine 1 which was also illustrated in FIG. 1. A container 39 accommodating a hoisting mechanism (not visible) is arranged on the ground next to the tower 2, i.e. at the base of the wind turbine 1. An anchoring point 40 is also provided on the ground in the vicinity of the wind turbine 1. A tag line 41 interconnects a cable 32, which is attached to the hoisting mechanism inside the container 39, and the anchoring point 40, via a connecting point in the nacelle 3. The tag line 41 could, e.g., have been lowered from the nacelle 3. The connecting point could, e.g., form part of a cable guiding structure as illustrated in FIGS. 13-20 and described above.

Using the tag line 41, the cable 32 is hoisted towards the nacelle 3, as indicated by arrows 42. When the cable 32 has been hoisted to the nacelle 3, it may be attached to a cable guiding structure, as illustrated in FIG. 15 and described above. Thereby the hoisting mechanism accommodated in the container 39 is connected to the cable guiding structure, via the cable 32.

Figure 22:
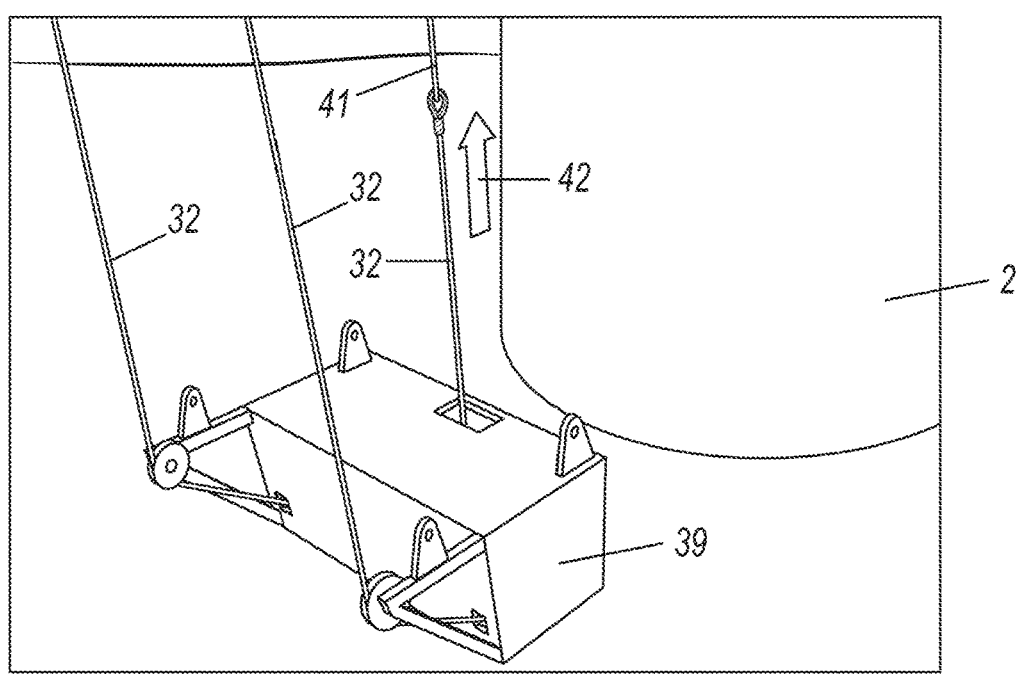

FIG. 22 shows the container 39 where two cables 32 have been hoisted to the nacelle and a third cable 32 is in the process of being hoisted towards the nacelle. When hoisting of the third cable 32 has been completed, the container 39 will be connected to the nacelle via all three cables 32, and the container 39 is thereby ready to be hoisted towards the nacelle by means of the hoisting mechanism accommodated in the container 39.

Figure 23:
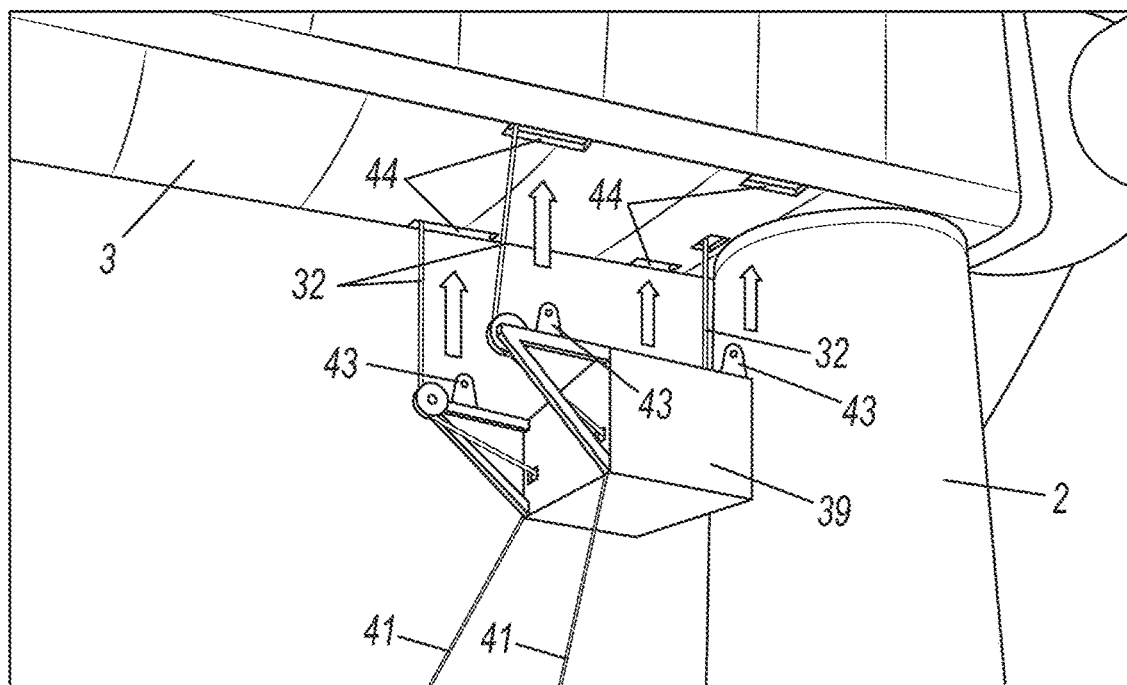

In FIG. 23 the container 39 is in the process of being hoisted towards the nacelle 3 by means of the hoisting mechanism accommodated in the container 39 and the cables 32. In order to control the movements of the container 39 during the hoisting, two tag lines 41 are provided which connect the container 39 to anchoring points 40 on the ground.

The container 39 is hoisted towards the nacelle 3 in such a manner that mounting interfaces 43 formed on the container 39 are moved into contact with corresponding mounting interfaces 44 formed on the lower part of the nacelle 3. As shown in FIG. 23, the lower part of the nacelle 3 includes four mounting interfaces 44 formed therein. Each mounting interface 44 is an elongated opening in the lower part of the nacelle 3 that is configured to receive a corresponding one of the mounting interfaces 43 formed on the container 39 therein. In that regard, the container 39 includes four mounting interfaces 43 formed on the container 39 in an arrangement that corresponds to the arrangement of the mounting interfaces 44 formed in the lower part of the nacelle 3. To this end, each mounting interface 43 formed on the container 39 is a lifting lug, or tang, having an eye or bore that is configured to receive a locking mechanism therethrough to lock the container 39 in place to the lower part of the nacelle 3. More particularly, when the interfaces 43, 44 are moved into contact, the locking mechanism will lock the interfaces 43, 44 together, thereby attaching the container 39 to the lower part of the nacelle 3.

Figure 24:
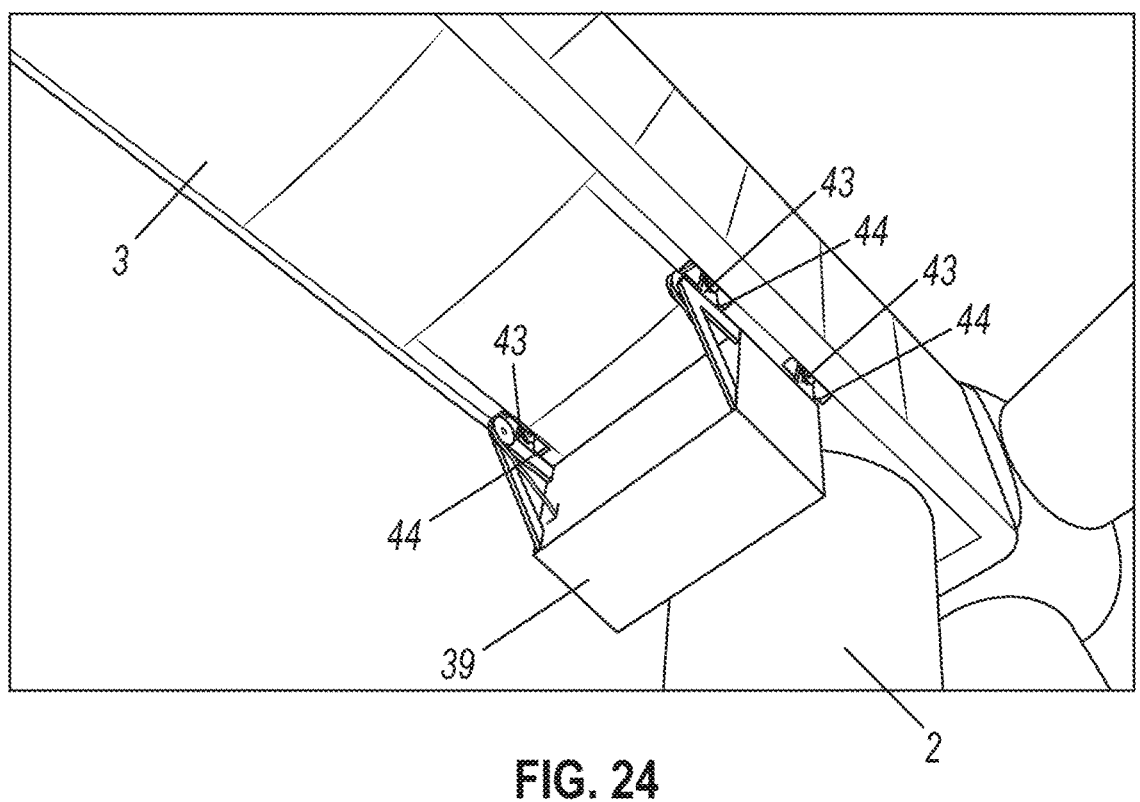

In FIG. 24 the interfaces 43, 44 have been moved into engagement, and the container 39 is thereby attached securely to the lower part of the nacelle 3. Furthermore, the tag lines have been removed.

Figure 25:
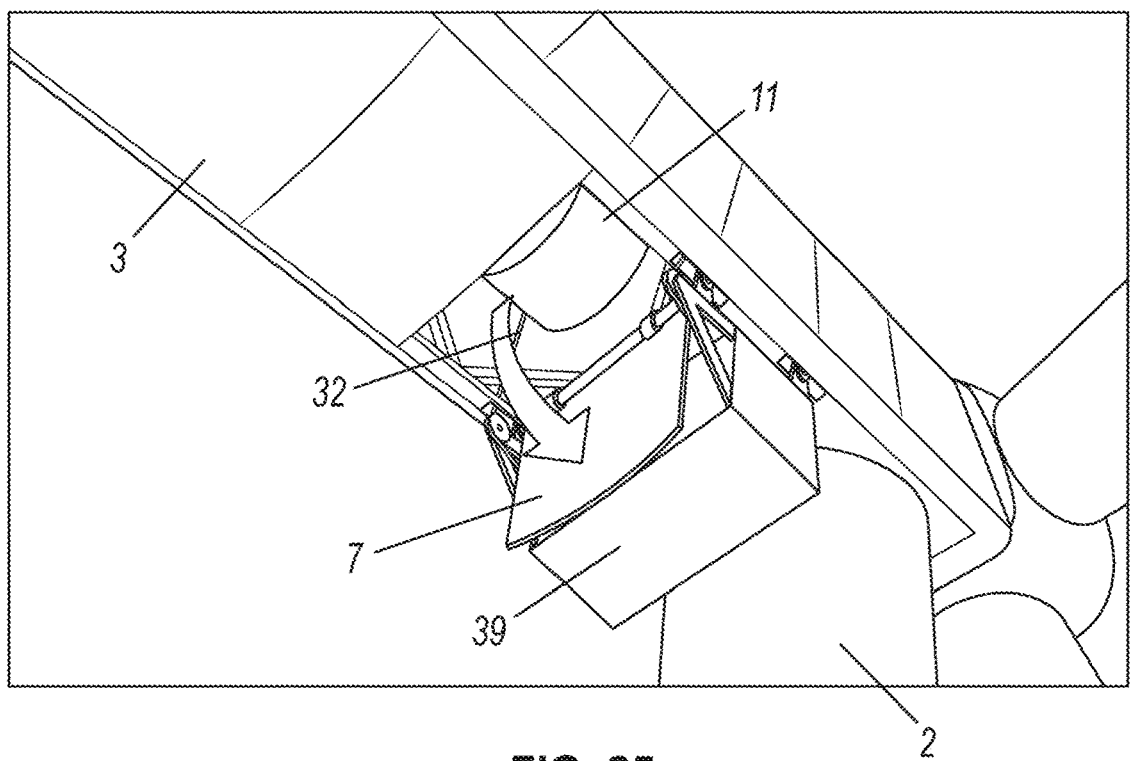

In FIG. 25 a hatch 7 formed in the lower part of the nacelle 3 has been opened, and the generator 11 can be seen through the opening which is thereby formed in the lower part of the nacelle 3. As described above, the generator 11 has been detached from the drive train and is connected to the hoisting mechanism accommodated in the container 39 via the cables 32. Thereby the generator 11 can be lowered towards the ground by means of the hoisting mechanism accommodated in the container 39. When doing so, the container 39 will stem against the lower part of the nacelle 3, and the nacelle 3 thereby performs the function of a counterweight. Accordingly, a separate counterweight is not required in order to lower the generator 11 towards the ground. This is a great advantage, because the costs involved with replacing a heavy drive train component can thereby be reduced considerably.

Figure 26:
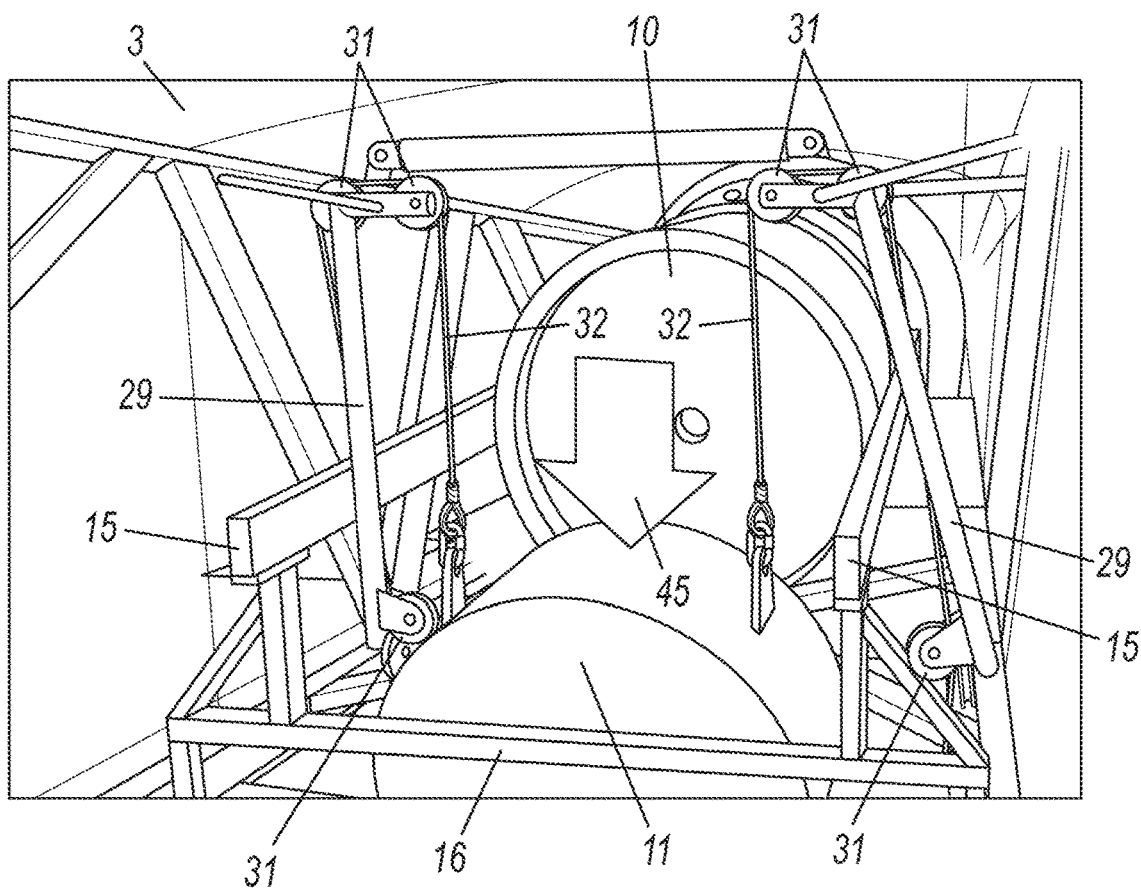

FIG. 26 illustrates the generator 11 being lowered towards the ground through the opening formed in the lower part of the nacelle 3, as indicated by arrow 45.

Figure 27:
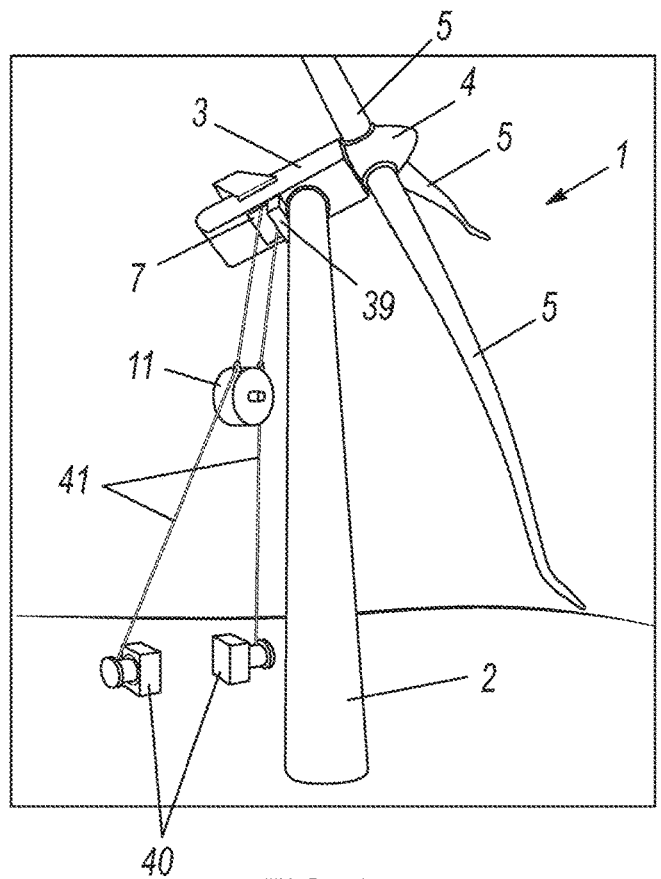

FIG. 27 shows the generator 11 being lowered towards the ground by means of the hosting mechanism accommodated in the container 39. The movement of the generator 11 is controlled by means of two tag lines 41, each being connected to an anchoring point 40 on the ground.

Figure 28:
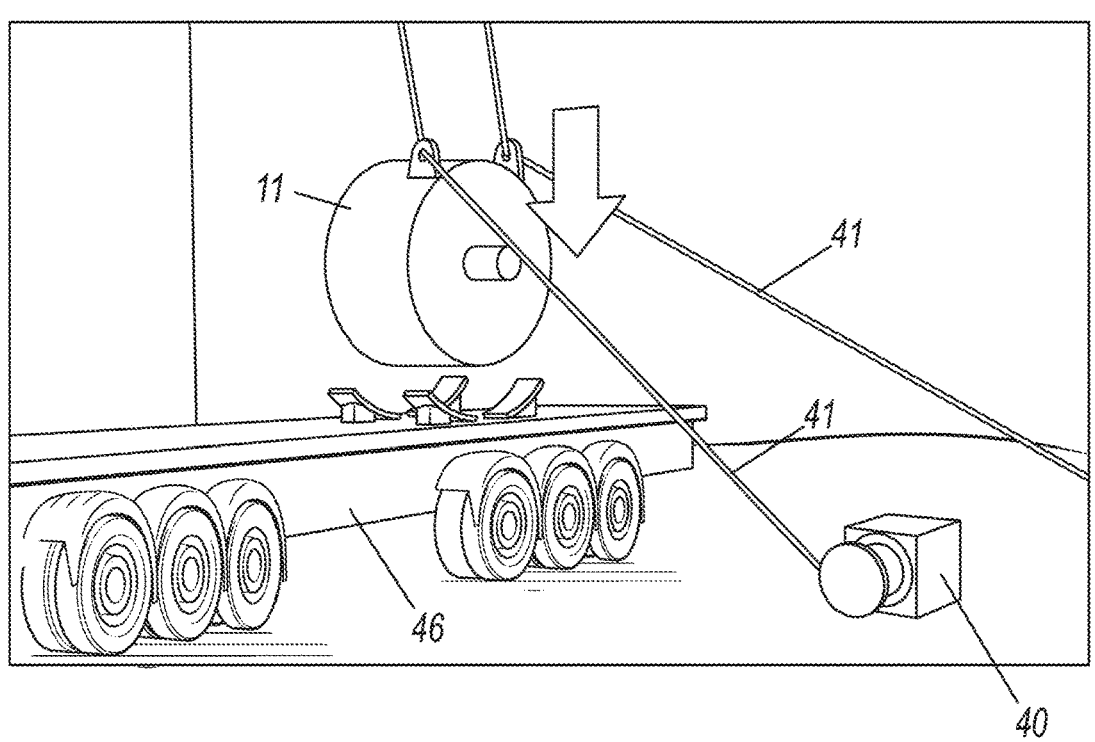

FIG. 28 shows the generator 11 being loaded onto a truck 46. The movements of the generator 11 are still controlled by means of the tag lines 41.

Figure 29:
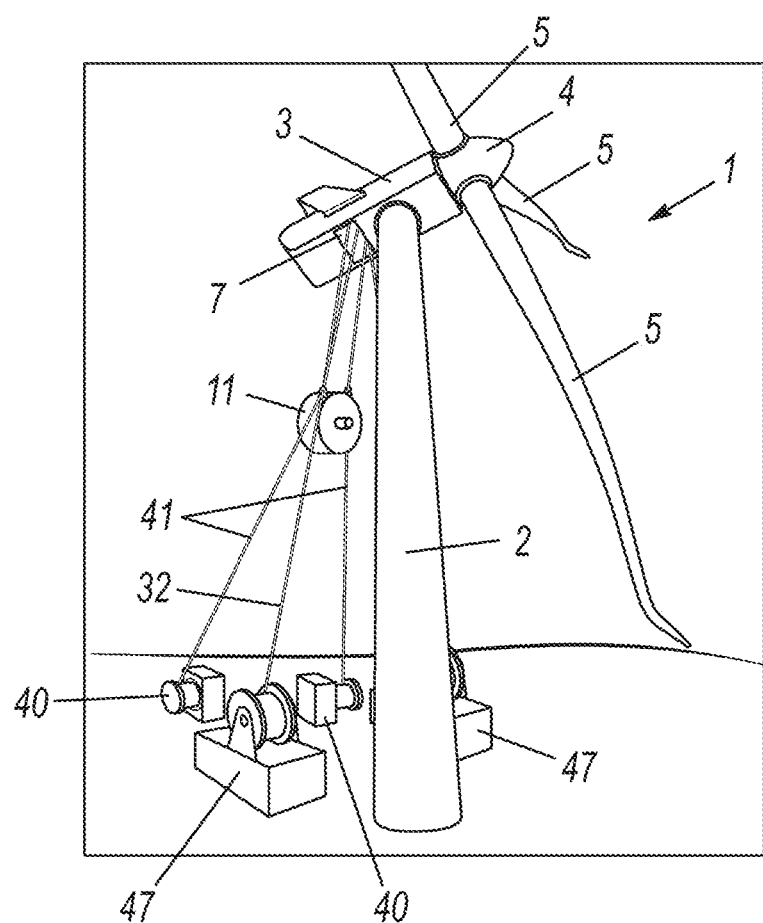

FIG. 29 shows an alternative embodiment in which the generator 11 is lowered towards the ground by means of two ground based winches 47 instead of by means of a hoisting mechanism accommodated in a container. The movements of the generator 11 are controlled partly by means of two tag lines 41, and partly by appropriately controlling operation of the two ground based winches 47 in dependence of each other.

Figure 30:
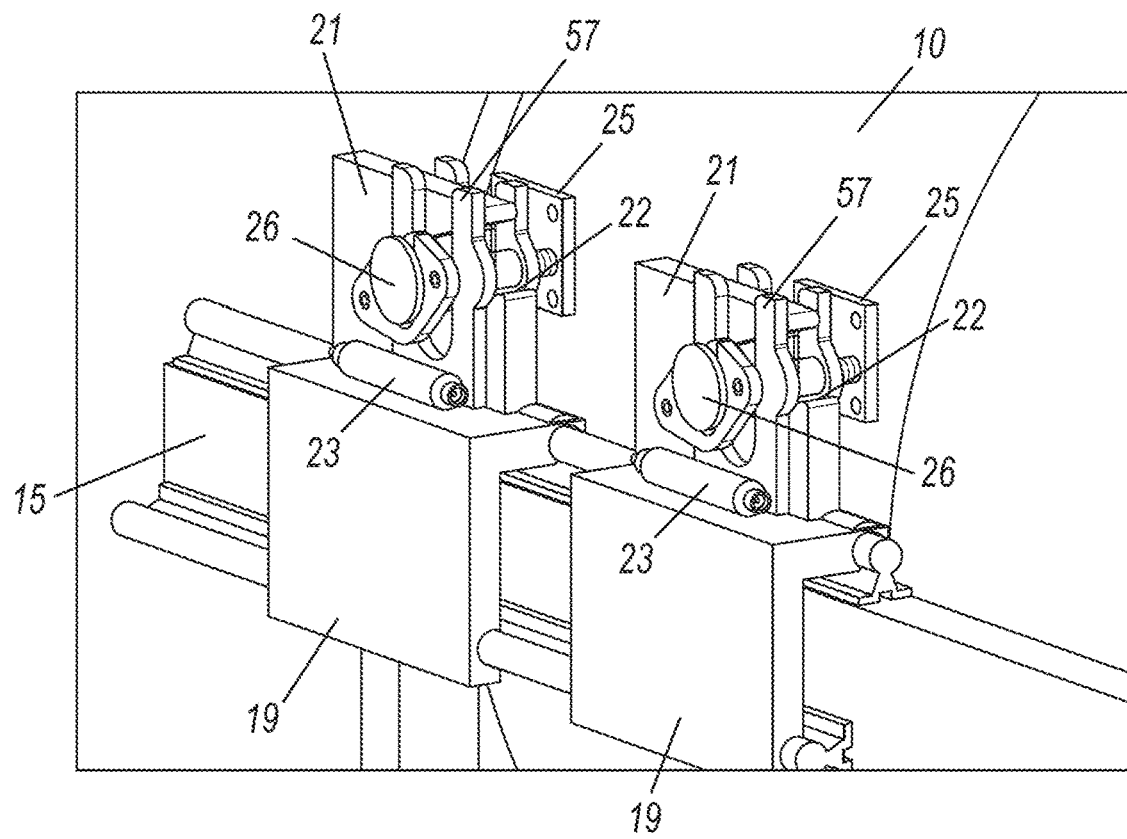
FIGS. 30-32 illustrate a sledge for use in a wind turbine according to an embodiment of the invention.
Figure 31:
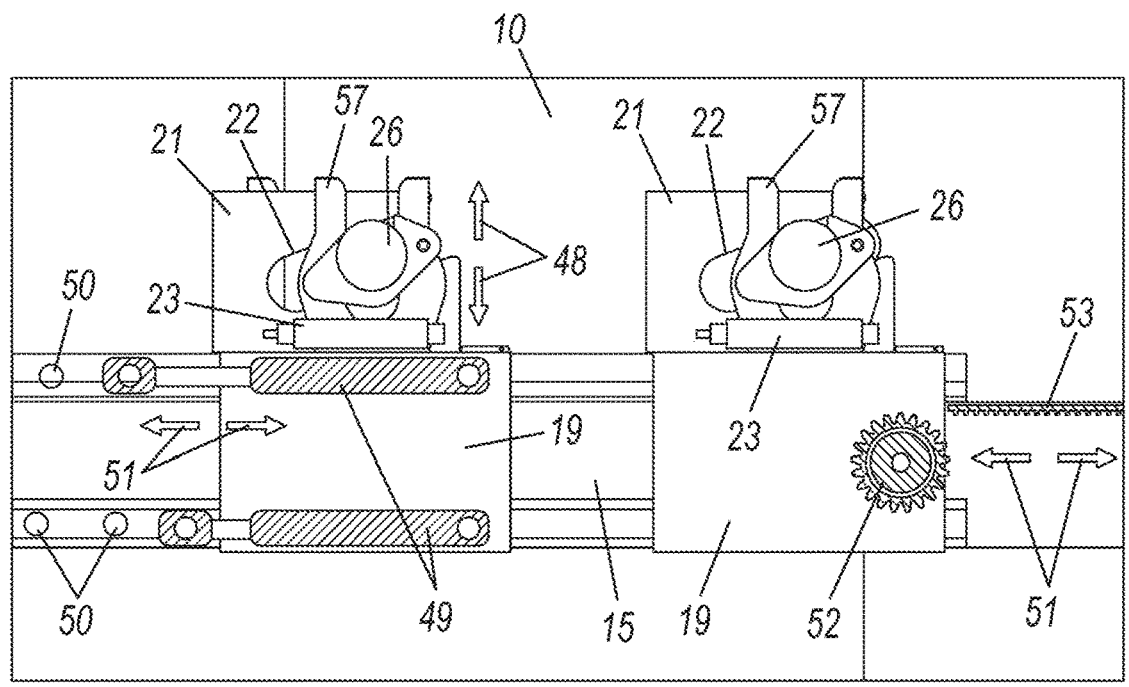
Figure 32:
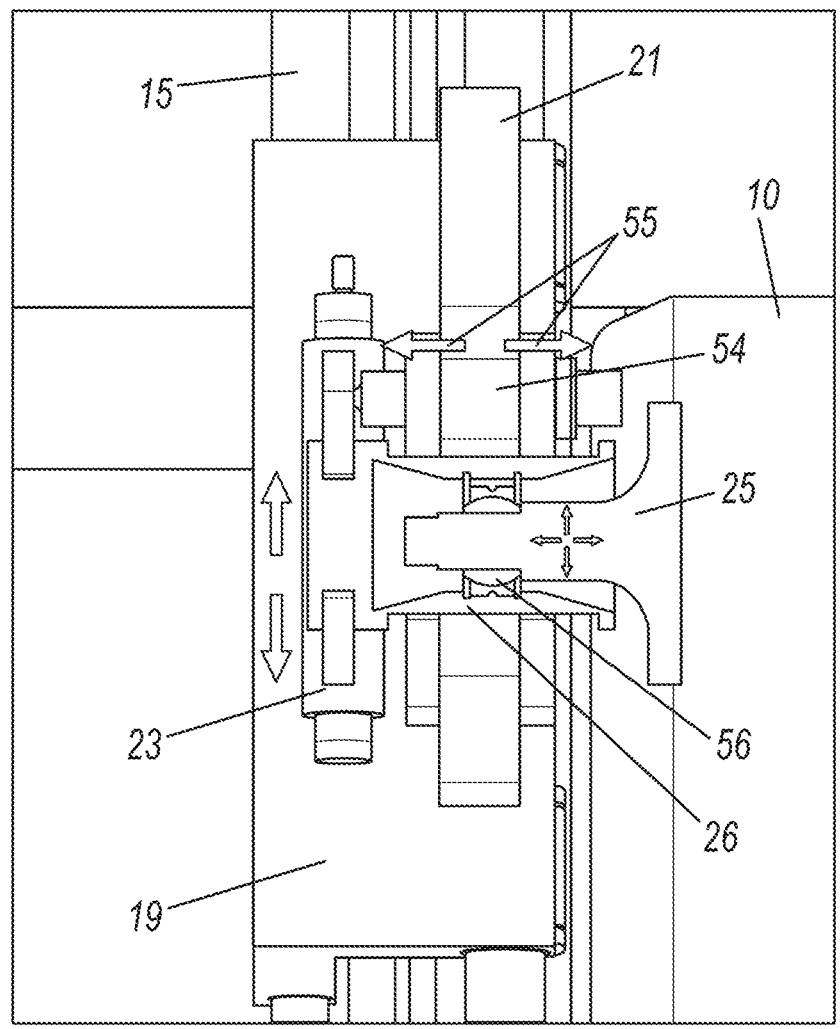

FIGS. 30-32 show the sledges 19 described above in further detail. FIG. 30 is a perspective view of two sledges 19 mounted movably on a sliding rail 15. Each sledge 19 comprises a guiding part 21 and a mating part 25 mounted on a drive train component, e.g. in the form of a gearbox 10. The guiding part 21 is provided with a guiding track 22, and the mating part 25 is provided with a protruding part 26 which is arranged in engagement with the guiding track 22 of the guiding part 21. A hydraulic piston 23 is arranged for providing relative movements between the guiding part 21 and the mating part 25 along a direction defined by the sliding rail 15.

When the guiding part 21 and the mating part 25 perform relative movements along the direction defined by the sliding rail 15, the protruding part 26 of the mating part 25 is caused to move along the guiding track 22 of the guiding part 21. Thereby the orientation and/or the position of the gearbox 10 relative to the sliding rail 15 can be adjusted. By performing relative movements of one of the sledges 19 in one direction while keeping the other sledge immovable or performing relative movements in an opposite direction, a rotational axis of the gearbox 10 is tilted relative to the direction defined by the sliding rail 15. If relative movements are performed by both sledges 19 in the same direction while sledges 19 arranged on an opposite side of the gearbox 10 are kept immovable or perform relative movements in an opposite direction, then the gearbox 10 will rotate about its rotational axis. If all of the sledges 19 perform relative movements in the same direction, then the gearbox 10 is moved in a translational manner in an upwards or downwards direction.

FIG. 31 is a side view of the sledges 19 of FIG. 31. Arrows 48 illustrate the relative movement between the protruding part 26 and the guiding track 22 of one of the sledges 19 as a consequence of operation of the hydraulic piston 23.

One of the sledges 19 is provided with two hydraulic pistons 49 which are used for moving the sledge 19 along the sliding rail 15. This takes place in the following manner. The hydraulic pistons 49 are each arranged in engagement with one of a number of recesses 50 formed in the sliding rail 15. One of the hydraulic pistons 49 is then operated in order to move the sledge 19 as indicated by arrows 51. Then one of the hydraulic pistons 49 is moved into engagement with another one of the recesses 50 while the other hydraulic piston 49 remains engaged with the recess 50, before one of the hydraulic pistons 49 is once again operated in order to move the sledge 19 further along the sliding rail 15. Thereby it is ensured that the sledge 19 does not accidentally slide along the sliding rail 15 when the hydraulic pistons 49 are moved in and out of engagement with the recesses 50. This is in particular relevant when the sliding rail 15 is inclined with respect to a horizontal direction.

The other sledge 19 is provided with an alternative moving mechanism comprising a toothed gear wheel 52 arranged the sledge 19 and a toothed rack 53 arranged on the sliding rail 15. Thereby the sledge 19 can be moved along the sliding rail 15 as indicated by arrows 51 by rotating the gear wheel 52 while it engages the toothed rack 53.

FIG. 32 is a top view of one of the sledges 19 of FIGS. 30 and 31. It can be seen from FIG. 32 that the sledge 19 is provided with an additional hydraulic piston 54 which causes relative movements of the guiding part 21 and the mating part 25 along the direction indicated by arrows 55, thereby allowing the position and/or the orientation of the gearbox 10 to be adjusted along this direction.

Furthermore, a spherical joint 56 is provided in the protruding part 26 of the mating part 25. This allows the protruding part 26 and the portion of the mating part 25 which is attached to the drive train component to perform relative movements. This, in turn, allows the guiding part 21 and the mating part 25 to move freely relative to each other when the hydraulic pistons 23, 54 are operated. Accordingly, it is possible to adjust the position and/or the orientation of the gearbox 10 with respect to six degrees of freedom.

It should be noted that in addition to the exemplary embodiments of the invention shown in the accompanying drawings, the invention may be embodied in different forms and should not be construed as limited to the embodiments set forth herein. Rather, these embodiments are provided so that this disclosure will be thorough and complete, and will fully convey the concept of the invention to those skilled in the art. The scope of the invention is thus indicated by the appended claims and all changes which come within the meaning and range of equivalency of the claims are therefore intended to be embraced.

The invention claimed is:

1. A wind turbine comprising:
    a tower,
    a nacelle mounted on the tower, and
    a movable container selectively mountable on a lower part of the nacelle, the movable container having sidewalls that define an interior of the moveable container and housing a hoisting mechanism located within the interior of the movable container, the hoisting mechanism comprising at least one winch and at least one cable coupled to the at least one winch,
    wherein the at least one winch and the at least one cable are configured to be operatively coupled to the nacelle to hoist the moveable container to the lower part of the nacelle to a mounted position in which the moveable container is attached to the lower part of the nacelle and to lower the moveable container away from the lower part of the nacelle, and
    wherein the at least one winch and the at least one cable are configured to be operatively coupled to a wind turbine component to lower the wind turbine component from the nacelle and to hoist the wind turbine component to the nacelle while the moveable container is in the mounted position.

2. The wind turbine according to claim 1, wherein the movable container further houses the at least one cable for use during hoisting and/or lowering of the wind turbine component such that the at least one cable extends from the interior of the container through at least one sidewall of the container to the nacelle to operatively couple the movable container to the nacelle.

3. The wind turbine according to claim 1, wherein the hoisting mechanism comprises at least two winches being operable in a coordinated manner during hoisting and/or lowering of the movable container and/or the wind turbine component.

4. The wind turbine according to claim 1, wherein the lower part of the nacelle is provided with a hatch allowing wind turbine components to pass there through.

5. The wind turbine according to claim 1, further comprising one or more cable guiding structures arranged in an interior part of the nacelle or on an outer part of the nacelle, and wherein the hoisting mechanism is connectable to a wind turbine component via the cable guiding structure(s) in order to move the wind turbine component in the nacelle by means of the hoisting mechanism.

6. The wind turbine according to claim 5, wherein the wind turbine component is a drive train component.

7. The wind turbine according to claim 1, wherein the movable container comprises one or more wheels configured to allow the movable container to roll against the tower during hoisting and/or lowering of the movable container.

8. A method for moving a wind turbine component of the wind turbine of claim 1, the method comprising the steps of:
    providing the movable container housing the hoisting mechanism, and arranging the movable container at a lower part of the tower,
    interconnecting the movable container and at least one anchoring point on the ground by means of at least one tag line,
    interconnecting the hoisting mechanism and at least one connecting point at the nacelle by means of the at least one cable,
    hoisting the movable container to a position at the lower part of the nacelle, using the hoisting mechanism and the tag line(s),
    mounting the movable container at the lower part of the nacelle, connecting the hoisting mechanism to a wind turbine component to be moved, and
    moving the wind turbine component by means of the hoisting mechanism and the tag line(s).

9. The method according to claim 8, wherein the step of moving the wind turbine component comprises lowering the wind turbine component from the nacelle towards the ground.

10. The method according to claim 8, wherein the step of moving the wind turbine component comprises hoisting the wind turbine component from the ground towards the nacelle.

11. The method according to claim 8, wherein the hoisting mechanism comprises at least two winches, and wherein the step of hoisting the movable container and/or the step of moving the wind turbine component comprises coordinated operation of the winches.

* * * * *